(12) United States Patent
He et al.

(10) Patent No.: US 11,008,463 B1
(45) Date of Patent: May 18, 2021

(54) THERMALLY STABLE AND SOLVENT-RESISTANT CONDUCTIVE POLYMER COMPOSITES

(71) Applicant: AMBILIGHT INC., Milpitas, CA (US)

(72) Inventors: Jiazhi He, Shenzhen (CN); Liyan You, West Lafayette, IN (US); Jianguo Mei, West Lafayette, IN (US)

(73) Assignee: AMBILIGHT INC., Milpitas, CA (US)

( * ) Notice: Subject to any disclaimer, the term of this patent is extended or adjusted under 35 U.S.C. 154(b) by 0 days.

(21) Appl. No.: 17/000,012

(22) Filed: Aug. 21, 2020

Related U.S. Application Data

(63) Continuation of application No. PCT/US2020/041851, filed on Jul. 13, 2020.

(51) Int. Cl.
*C08K 5/07* (2006.01)
*C08L 83/08* (2006.01)
*C08G 77/24* (2006.01)
*C08K 5/05* (2006.01)
*C08G 61/12* (2006.01)
*C08G 77/06* (2006.01)

(52) U.S. Cl.
CPC ............ *C08L 83/08* (2013.01); *C08G 61/126* (2013.01); *C08G 77/06* (2013.01); *C08G 77/24* (2013.01); *C08K 5/05* (2013.01); *C08K 5/07* (2013.01); *C08G 2261/1424* (2013.01); *C08G 2261/3247* (2013.01); *C08G 2261/50* (2013.01); *C08G 2261/76* (2013.01); *C08G 2261/79* (2013.01); *C08L 2201/08* (2013.01); *C08L 2203/16* (2013.01); *C08L 2203/20* (2013.01); *C08L 2312/08* (2013.01)

(58) Field of Classification Search
None
See application file for complete search history.

(56) References Cited

U.S. PATENT DOCUMENTS

| | | |
|---|---|---|
| 2003/0127969 A1 | 7/2003 | Aoki et al. |
| 2005/0147846 A1 | 7/2005 | Marks et al. |
| 2006/0202195 A1 | 9/2006 | Marks et al. |
| 2015/0353650 A1 | 12/2015 | Nicolay et al. |
| 2017/0365418 A1* | 12/2017 | Schumann ........... C08G 61/126 |

OTHER PUBLICATIONS

Shin et al. "Electrical transport characteristics of chemically robust PDPP-DTT embedded in a bridged silsesquioxane network." Journal of Materials Chemistry C 7, No. 47 (2019): 14889-14896. (Year: 2019).*

(Continued)

*Primary Examiner* — Robert S Loewe
(74) *Attorney, Agent, or Firm* — Sheppard Mullin Richter & Hampton LLP

(57) ABSTRACT

A thermally stable and solvent resistant conductive polymer composite and its manufacturing friendly preparation method are disclosed. The disclosed composite presents great electrical conductivity with thermal stability and solvent resistance. A method of mixing a host conjugated polymer and a crosslinkable silane precursor simultaneously introduces both dopant and rigid cross-linked siloxane network into polymer system. The thin film made by the disclosed thermally stable and solvent resistant conductive polymer composite can be applied to fabricate various devices.

13 Claims, 18 Drawing Sheets

Crosslinked Siloxane Network

Simplified Crosslinked Siloxane Network

(56) References Cited

OTHER PUBLICATIONS

Supporting information for Shin et al. "Electrical transport characteristics of chemically robust PDPP-DTT embedded in a bridged silsesquioxane network." Journal of Materials Chemistry C 7, No. 47 (2019): 8 pages. (Year: 2019).*
Park et al. "Organic Electronics: Universal Route to Impart Orthogonality to Polymer Semiconductors for Sub-Micrometer Tandem Electronics (Adv. Mater. 28/2019)." Advanced Materials 31, No. 28 (2019): 1970204. (Year: 2019).*
Supporting information for Park et al. "Organic Electronics: Universal Route to Impart Orthogonality to Polymer Semiconductors for Sub-Micrometer Tandem Electronics (Adv. Mater. 28/2019)." Advanced Materials 31, No. 28 (2019): 47 pages. (Year: 2019).*
PCT International Search Report and the Written Opinion dated Oct. 7, 2020, issued in related International Application No. PCT/US2020/041851 (9 pages).
Osterholm, Anna, et al., "Solution Processed PEDOT Analogues in Electrochemical Supercapacitors", ACS Applied Materials & Interfaces, 2016, vol. 8, Issue 21, pp. 13492-13498 (i.e, pp. A-G).
Ponder James, et al., "Conductive, Solution-Processed Dioxylhiophene Copolymers for Thermoelectric and Transparent Electrode Applications", Advanced Energy Materials, 2019, vol. 9, Issue 24, Article 1900395, pp. 1-7; [Published online: May 6, 2019].
Ponder James, et al., "Conjugated Polyelectrolytes as Water Processable Precursors to Aqueous Compatible Redox Active Polymers for Diverse Applications: Electrochromism, Charge Storage, and Biocompatible Organic Electronics", ACS Publications, Chemistry of Materials, 2017, vol. 29, Issue 10, pp. 4385-4392 (i.e, pp. A-H).

\* cited by examiner

Crosslinked Siloxane Network

Host Conjugated Polymers

Simplified Crosslinked Siloxane Network

Doped Host Conjugated Polymers Stabilized by Crosslinked Siloxane Network

THERMALLY STABLE AND SOLVENT-RESISTANT CONDUCTIVE POLYMER COMPOSITES

CROSS REFERENCE TO RELATED APPLICATION

The present application is a continuation application of International Application No. PCT/US2020/041851, filed on Jul. 13, 2020, and entitled "THERMALLY STABLE AND SOLVENT-RESISTANT CONDUCTIVE POLYMER COMPOSITES," the content of which is incorporated herein by reference in its entirety.

TECHNICAL FIELD

The present disclosure is generally related to thermally stable and solvent-resistant conductive polymer composite and methods for preparing the same.

BACKGROUND

Conjugated polymers (CPs) have been widely used in all kinds of electronic devices. To improve CPs' robust electrical conductivity under elevating temperatures and/or various solvent environments, doping is demonstrated to be a powerful means. However, organic doping is typically sensitive to external stimuli such as heat, moisture and chemicals which lead to a de-doping process. For instance, thermal stress often induces and accelerates conformational changes of polymer chains, and further results in microscale or morphological disorder in conjugated polymer thin films. In doped thin films, this process is often accompanied with the expelling of dopant molecules, and causes a decrease of conductivity and degradation of device performance. Molecular dopants such as ferric chloride or $F_4TCNQ$ enable stable doping of poly(3-hexylthiophene) under ambient conditions, but exhibit a large tendency to diffuse out at high temperatures because of their relatively small sizes, thus suffer from the thermal instability.

Since designing novel dopants or developing new doping methods to achieve CPs' robust electrical conductivity with the conventional doping approaches requires huge synthesis or processing efforts, simple and efficient designs and manufacturing friendly preparation methods for thermally stable and solvent-resistant doped systems are highly desired.

SUMMARY

Described herein are a thermally stable and solvent-resistant conductive polymer composite and methods for preparing the same.

In one aspect, the disclosure describes a thermally stable and solvent-resistant conductive polymer composite comprising a doped host conjugated polymer (CP) and a crosslinked siloxane network.

In some embodiments, the crosslinked siloxane network is produced from a crosslinkable silane precursor with a formula of

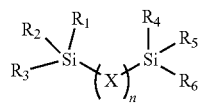

wherein n is an integer greater than 0; X is a monomer unit and is selected from one or more of a group including: oxygen, urea group ($N_2H_2CO$—), $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$cycloalkylalkyloxy, $C_1$-$C_{12}$heterocyclyl, $C_1$-$C_{12}$heterocyclyloxy, $C_3$-$C_{30}$heterocyclylalkyloxy, $C_1$-$C_{30}$heterocyclylalkyloxy, $C_1$-$C_{30}$heterocyclylaminyl, $C_5$-$C_{30}$heterocyclylalkylaminyl, $C_2$-$C_{12}$heterocyclylcarbonyl, $C_3$-$C_{30}$heterocyclylalkyl, $C_1$-$C_{13}$ heteroaryl, or $C_3$-$C_{30}$ heteroarylalkyl, or any combination, among others; each of $R_1$, $R_2$, $R_3$, $R_4$, $R_5$, and $R_6$ is independently selected from a group including: hydrogen, halide groups, hydroxyl group, carboxylic groups, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$cycloalkylalkyloxy, $C_1$-$C_{12}$heterocyclyl, $C_1$-$C_{12}$heterocyclyloxy, $C_3$-$C_{30}$heterocyclylalkyloxy, $C_1$-$C_{30}$heterocyclylalkyloxy, $C_1$-$C_{30}$heterocyclylaminyl, $C_5$-$C_{30}$heterocyclylalkylaminyl, $C_2$-$C_{12}$heterocyclylcarbonyl, $C_3$-$C_{30}$heterocyclylalkyl, $C_1$-$C_{13}$heteroaryl, or $C_3$-$C_{30}$heteroarylalkyl, among others; at least three out of $R_1$, $R_2$, $R_3$, $R_4$, $R_5$, and $R_6$ are selected from a group including a chloride group, a bromine group, a hydroxyl group or an alkyloxyl groups which can form condensation reactions; and at least one out of $R_1$, $R_2$, $R_3$, $R_4$, $R_5$, and $R_6$ comprise a doping agent.

In some embodiments, the crosslinked siloxane network is produced from a crosslinkable silane precursor with a formula of

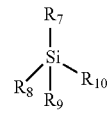

wherein each of $R_7$, $R_8$, $R_9$, and $R_{10}$ is independently selected from a group including: hydrogen, halide groups, hydroxyl group; carboxylic groups, $C_1$-$C_{30}$alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$cycloalkylalkyloxy, $C_1$-$C_{12}$heterocyclyl, $C_1$-$C_{12}$heterocyclyloxy, $C_3$-$C_{30}$heterocyclylalkyloxy, $C_1$-$C_{30}$heterocyclylalkyloxy, $C_1$-$C_{30}$heterocyclylaminyl, $C_5$-$C_{30}$heterocyclylalkylaminyl, $C_2$-$C_{12}$heterocyclylcarbonyl, $C_3$-$C_{30}$heterocyclylalkyl, $C_1$-$C_{13}$heteroaryl, or $C_3$-$C_{30}$heteroarylalkyl, among others; at least three of the $R_7$, $R_8$, $R_9$, and $R_{10}$ group are selected from a group including chloride group, bromine group, hydroxyl group or alkyloxyl groups which can form condensation reaction; and at least one out of $R_7$, $R_8$, $R_9$, and $R_{10}$ comprise a doping agent.

In some embodiments, the siloxane network is produced from a combination of silane precursors which include at least one of two crosslinkable silane precursors immediately listed above. Besides any of the crosslinkable silane precursors immediately listed above, non-crosslinkable silane precursors which cannot form crosslinked siloxane network may be included in the system.

In some embodiments, the siloxane network is produced from a crosslinkable chlorosilane precursor with a formula of

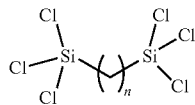

wherein n is an integer greater than 0, and equal to or less than 13.

In some embodiments, the siloxane network is produced from a crosslinkable chlorosilane precursor with a formula of

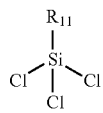

wherein Ru is selected from a group including: hydrogen, halide groups, hydroxyl group; carboxylic groups, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$ cycloalkylalkyloxy, $C_1$-$C_{12}$heterocyclyl, $C_1$-$C_{12}$heterocyclyloxy, $C_3$-$C_{30}$heterocyclylalkyloxy, $C_1$-$C_{30}$heterocyclylalkyloxy, $C_1$-$C_{30}$heterocyclylaminyl, $C_5$-$C_{30}$heterocyclylalkylaminyl, $C_2$-$C_{12}$heterocyclylcarbonyl, $C_3$-$C_{30}$heterocyclylalkyl, $C_1$-$C_{13}$ heteroaryl, or $C_3$-$C_{30}$ heteroarylalkyl, among others;

In some embodiments, the siloxane network is produced from some crosslinkable chlorosilanes with the formula of:

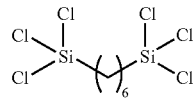

Crosslinkable chlorosilane with 6 spacers (C6-Si) or

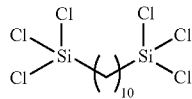

Crosslinkable chlorosilane with 10 spacers (C10-Si) or

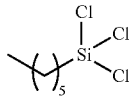

Crosslinkable chlorosilane with mono-trichlorosilyl ($C_M$—Si)

The disclosed thermally stable and solvent-resistant electrochromic conjugated polymer composite comprises a host conjugated polymer (CP) which comprises a p-type conjugated polymers with an oxidation potential lower than 0.4 V vs. Ag/AgCl.

Various embodiments described here are involved in the different host CPs forming the disclosed thermally stable and solvent-resistant conductive polymer composite. In some embodiments, the host CP comprises dioxythiophene copolymers which contain solubilizing 3,4-propylenedioxythiophene (ProDOT) units and electron rich 3,4-ethylenedioxythiophene (EDOT) units with a formula of

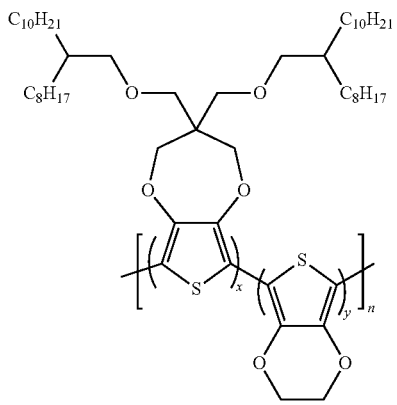

wherein x is an integer greater than 0; y is an integer equal to or greater than 0; and n is an integer greater than 0. The values of x, y may indicate ratios of two monomer units, but not necessarily the real monomer sequence in the polymer. This means the reaction might be ordered polymerization or random polymerization. The host CP comprises ProDOT$_x$-EDOT$_y$ ($P_xE_y$) with the average ratio of y:x ranging from 0 to 10. An example $P_xE_y$ polymer is PE3, which sequence can be, for example, PE-PEEEE-PEE-PEEEEE-PEEE . . . with average ratio of y:x is 3 for random polymerization and PEEE-PEEE-PEEE-PEEE-PEEE . . . for ordered polymerization.

In some embodiments, the host CPs comprises dioxythiophene copolymers $P_xE_y$, with x=1, and y=1, 2 or 3.

In another aspect, the disclosure describes a method for preparation of the thermally stable and solvent-resistant conductive polymer composite. The method comprises: providing a solution of crosslinkable silane precursors in a solvent; providing a solution of conjugated polymers in a solvent; producing a composite solution by mixing the solution of crosslinkable silane precursors with the solution of host conjugated polymers with a weight ratio of the crosslinkable silane precursors in a range of 0.1 to 90 wt % for a reaction time up to 168 hours; an optional step of breaking the hydrogen bond with a hydrogen bond interrupting solvent and promoting the solution consistency if needed. Conventional coating techniques can be used to coating the composite solution onto a substrate to form the thermally stable and solvent-resistant conductive polymer composite thin film.

In some embodiments, the solvent for preparing the solution of crosslinkable silane precursors and the solution of host conjugated polymer is selected from one or more of aprotic solvents, such as chloroform, dichloromethane, nitromethane, or toluene.

In some embodiments, the hydrogen bond interrupting solvent is a solvent which can be used to break hydrogen bond. Example hydrogen bond interrupting solvents may include alcohol and acetone.

In some illustrative embodiments, the present invention relates to a device or a machine incorporated the composite thin film as disclosed herein.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings below.

FIG. 1 (A) shows a scheme of crosslinked siloxane network formed by crosslinkable silane precursors; FIG. 1 (B) is a simplified diagram of the crosslinked siloxane network; FIG. 1 (C) shows a scheme of host conjugated polymers (CPs); FIG. 1 (D) is a scheme of conductive polymer composite comprised of host CPs and crosslinked siloxane network.

FIG. 10 (A) is for $C_6$—Si/$PE_3$, FIG. 10 (B) is for $L_6$-Si/$PE_3$, and FIG. 10 (C) is for F—Si/$PE_3$.

FIG. 16(A) is for $C_M$—Si/$PE_3$ composites, FIG. 16(B) is for $C_M$—Si/$PE_2$ composites, and FIG. 16(C) is for $C_M$—Si/$PE_1$ composites.

DETAILED DESCRIPTION OF EMBODIMENTS

Figure 1A:
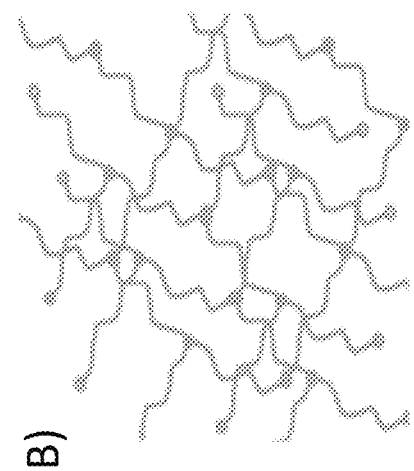
FIGS. 1(A)-(D) are schemes of components for the disclosed conductive polymer composite.
Figure 1B:
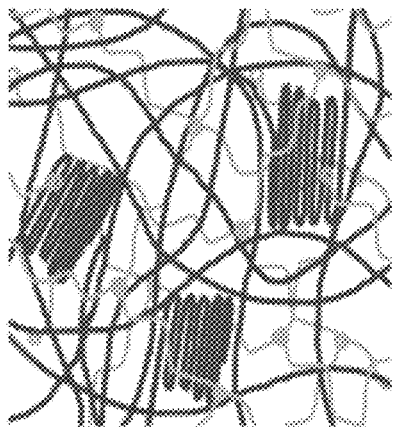
Figure 1C:
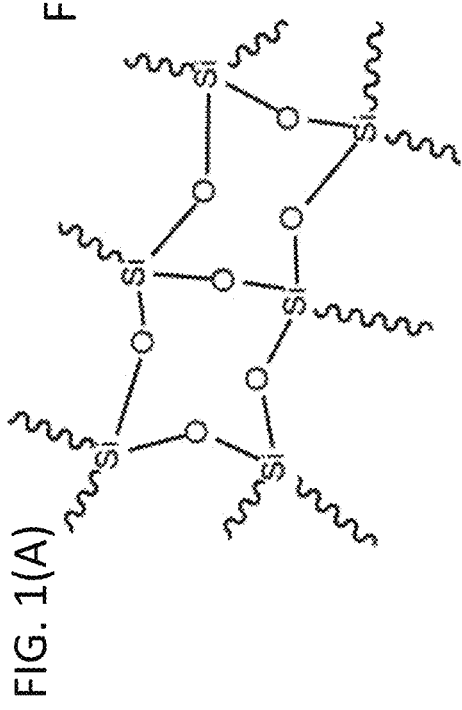
Figure 1D:
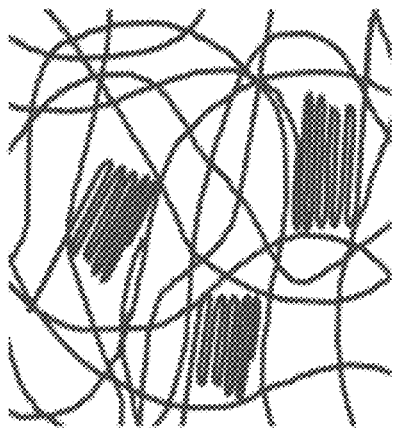
Figure 2A:
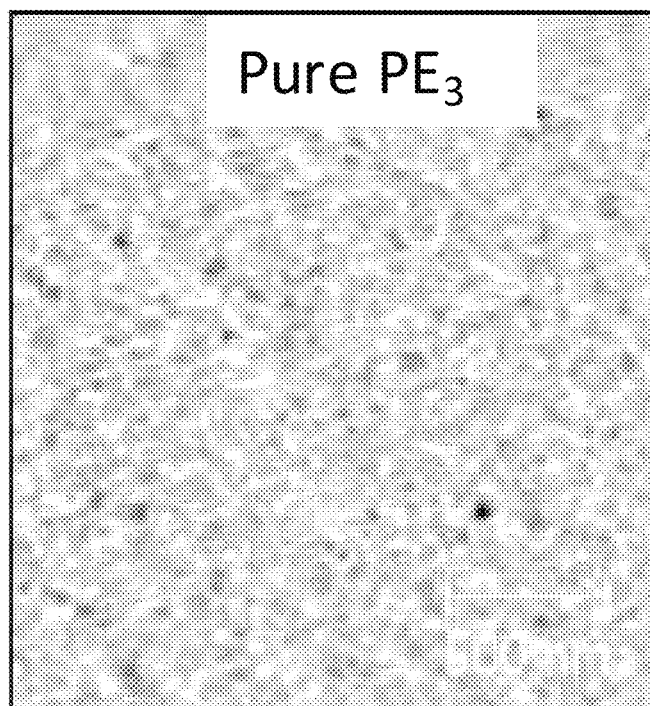
FIGS. 2 (A)-(B) contain AFM phase images of pure $PE_3$ host CP (FIG. 2 (A)) and $C_6$—Si/$PE_3$ (FIG. 2 (B)).
Figure 2A:
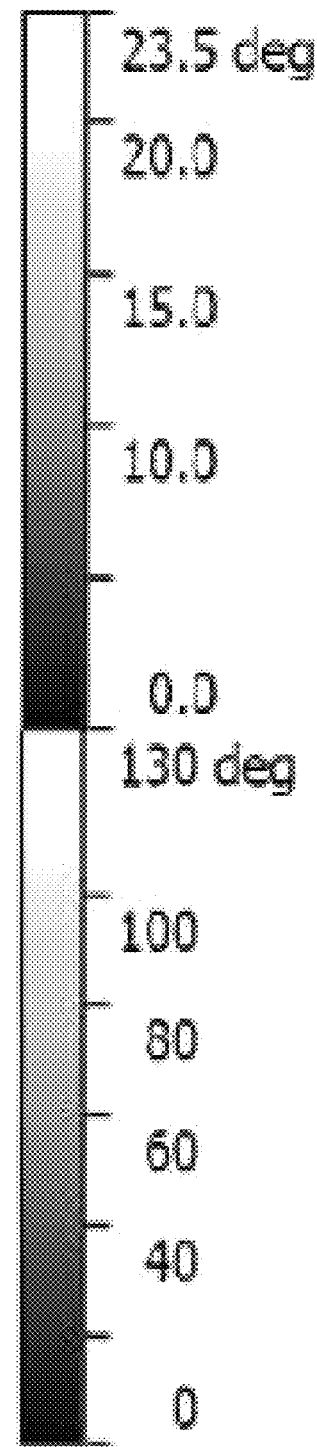
Figure 2B:
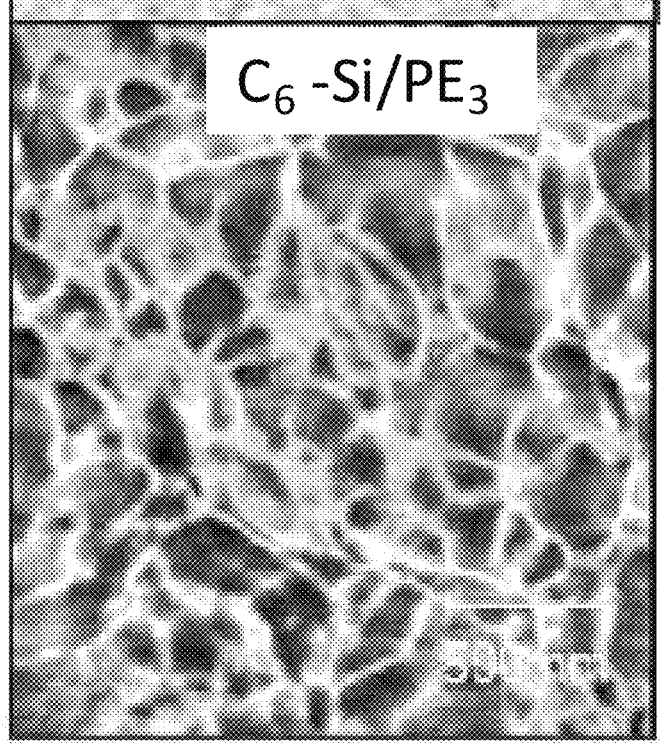
Figure 2B:
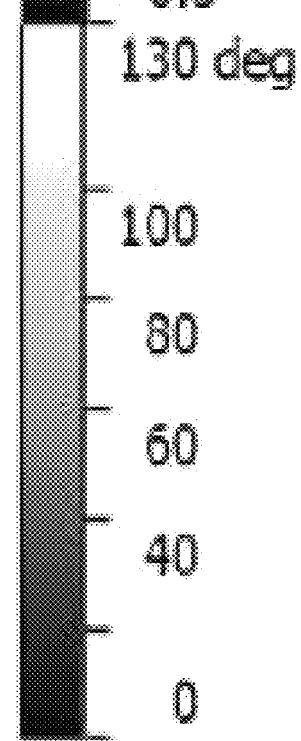

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. In the present disclosure the term "about" can allow for a degree of variability in a value or range, for example, within 10%, within 5%, or within 1% of a stated value or of a stated limit of a range. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

The disclosure describes a thermally stable and solvent-resistant conductive polymer composite comprising a doped host conjugated polymer (CP) and a crosslinked siloxane network.

Reference throughout this specification to the testing results of "conductive polymer composites" or "composites" are referring to the testing results of the processed thin films deposited on glass substrate.

Various embodiments described herein are directed to different forms of crosslinkable silane precursors as well as different host conjugated polymers (CPs) to form the thermally stable and solvent-resistant conductive polymer composite thin films. The low oxidation potentials of the host conjugated polymers allow them to be readily doped. The crosslinkable silane precursors need at least three functional groups to form a crosslinked siloxane network by condensation reactions and also have at least one doping agent for the doping reaction. When mixing the solutions of the silane precursors and the conjugated polymers, the crosslinkable silane precursors form a crosslinked siloxane network inside the host CPs while the doping reaction between the silane precursors and the conjugated polymers simultaneously occurs (as illustrated in FIG. 1 (A)-(C)). The siloxane network is formed by mixing host conjugated polymers with crosslinkable silane precursors. During mixing, the functional groups which can have condensation reactions are substituted with hydroxides from the marginal amount of moisture in the chloroform, producing silanol groups in the solution. Two neighboring silanol groups in adjacent precursors go through the condensation reactions in the solution to form the crosslinked siloxane network as shown in FIG. 1 (A). In addition, the low oxidation potentials of the host conjugated polymers illustrated in FIG. 1 (B) allow them to be readily doped. The doping agents from silane precursor can perform doping reactions with the host CPs while forming the crosslinked network within the host CPs to form the conductive polymer composites as shown in FIG. 1 (C). The crosslinked siloxane network prevents rearrangement of doped polymer chain and dopant diffusion by confining the doped polymer chains, as well as benefits the doping stability since de-doping is also a process associated with conformational and morphological changes. Thus, the introduction of the crosslinked siloxane network not only can greatly enhance the electrical conductivity of CPs, but also can improve the thermal stability and solvent resistance of the CPs.

In some embodiments, the crosslinked siloxane network is produced from a crosslinkable silane precursor with a formula of

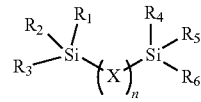

(1)

wherein:

n is an integer greater than 0;

X is a monomer unit and is selected from one or more of a group including: oxygen, urea group ($N_2H_2CO$—), $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$cycloalkylalkylaminyl, $C_5$-$C_{30}$cycloalkylalkyl, $C_5$-$C_{30}$cycloalkylalkyloxy, $C_1$-$C_{12}$heterocyclyl, $C_1$-$C_{12}$heterocyclyloxy, $C_3$-$C_{30}$heterocyclylalkyloxy, $C_1$-$C_{30}$heterocyclylalkyloxy, $C_1$-$C_{30}$heterocyclylaminyl, $C_5$-$C_{30}$heterocyclylalkylaminyl, $C_2$-$C_{12}$heterocyclylcarbonyl, $C_3$-$C_{30}$heterocyclylalkyl, $C_1$-$C_{13}$ heteroaryl, or $C_3$-$C_{30}$ heteroarylalkyl, or any combination, among others;

each of $R_1$, $R_2$, $R_3$, $R_4$, $R_5$, and $R_6$ is independently selected from: hydrogen, halide groups, hydroxyl group; carboxylic groups, $C_1$-$C_{30}$alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$cycloalkylalkyloxy, $C_1$-$C_{12}$heterocyclyl, $C_1$-$C_{12}$heterocyclyloxy, $C_3$-$C_{30}$heterocyclylalkyloxy, $C_1$-$C_{30}$heterocyclylalkyloxy, $C_1$-$C_{30}$heterocyclylaminyl, $C_5$-$C_{30}$heterocyclylalkylaminyl, $C_2$-$C_{12}$heterocyclylcarbonyl, $C_3$-$C_{30}$heterocyclylalkyl, $C_1$-$C_{13}$heteroaryl, or $C_3$-$C_{30}$heteroarylalkyl, among others;

at least three out of $R_1$, $R_2$, $R_3$, $R_4$, $R_5$, and $R_6$ are selected from a group including a chloride group, a bromine group, a hydroxyl group or an alkyloxyl group which can form condensation reaction, and at least one out of $R_1$, $R_2$, $R_3$, $R_4$, $R_5$, and $R_6$ comprise a doping agent.

Although silane precursors have at least three functional groups which can form condensation reactions to form the crosslinked siloxane network, silane precursors with two functional groups which can form condensation reactions can form linear siloxane bridges which can wind and twist within the host conjugated polymer and form a siloxane matrix. Although such siloxane matrix is not crosslinked, it helps confine the polymer chains to some degree, thus can also greatly enhance electrical conductivity (4-5 orders compared with 6 orders for systems formed by at least three functional groups for some embodiments) of CPs, but its thermal stability is not as good as the silane precursor with at least three functional groups.

In some embodiments, the crosslinked siloxane network is produced from a crosslinkable silane precursor with the formula of

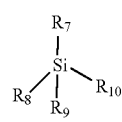

(2)

wherein each of $R_7$, $R_8$, $R_9$, and $R_{10}$ is independently selected from: hydrogen, halide groups, hydroxyl group; carboxylic groups, $C_1$-$C_{30}$alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$cycloalkylalkyloxy, $C_1$-$C_{12}$heterocyclyl, $C_1$-$C_{12}$heterocyclyloxy, $C_3$-$C_{30}$heterocyclylalkyloxy, $C_1$-$C_{30}$heterocyclylalkyloxy, $C_1$-$C_{30}$heterocyclylaminyl, $C_5$-$C_{30}$heterocyclylalkylaminyl, $C_2$-$C_{12}$heterocyclylcarbonyl, $C_3$-$C_{30}$heterocyclylalkyl, $C_1$-$C_{13}$heteroaryl, or $C_3$-$C_{30}$heteroarylalkyl, among others; at least three of the $R_7$, $R_8$, $R_9$, and $R_{10}$ group are selected from a group including a chloride group, a bromine group, a hydroxyl group or an alkyloxy group which can form condensation reaction, and at least one of the $R_7$, $R_8$, $R_9$, and $R_{10}$ group comprises a doping agent.

Although silane precursors require at least three functional groups which can form condensation reactions to form the crosslinked siloxane network, silane precursors with two functional groups which can form condensation reactions can form linear siloxane bridges which can wind and twist within the host conjugated polymer and form a siloxane matrix. Although such siloxane matrix is not crosslinked, it helps confine the polymer chains to some degree, thus can also greatly enhance electrical conductivity (4-5 orders compared with 6 orders for systems formed by at least three functional groups for some embodiments) of CPs, but the thermal stability is not as good as the silane precursor with at least three functional groups.

In some embodiments, the siloxane network is produced from a combination of silane precursors which include at least one of two crosslinkable silane precursors of the above formulas (1) and (2). Besides any of the crosslinkable silane precursors in formulas (1) and (2), non-crosslinkable silane precursors which cannot form crosslinked siloxane network (for example, silane precursors with only one or two functional groups) may be included in the system.

In some embodiments, the crosslinked siloxane network is produced from a crosslinkable chlorosilane with a formula of

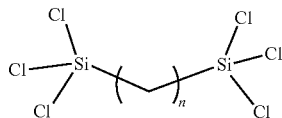

wherein:
n is the number of spacer carbon;
n is an integer greater than 0 and ranges from 1-13.

Here chlorine groups function not only for condensation reaction, but also act as doping agents and form doping reaction with the host CPs.

In some embodiments, the crosslinked siloxane network is produced from a crosslinkable chlorosilane precursor with a formula of

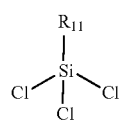

wherein $R_{11}$ is selected from a group including: hydrogen, halide groups; hydroxyl group; carboxylic groups,  $C_1$-$C_{30}$alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$cycloalkylalkyl, $C_5$-$C_{30}$ cycloalkylalkyloxy, $C_1$-$C_{12}$heterocyclyl, $C_1$-$C_{12}$heterocyclyloxy, $C_3$-$C_{30}$heterocyclylalkyloxy, $C_1$-$C_{30}$heterocyclylalkyloxy, $C_1$-$C_{30}$ heterocyclylaminyl, $C_5$-$C_{30}$heterocyclylalkylaminyl, $C_2$-$C_{12}$heterocyclylcarbonyl, $C_3$-$C_{30}$heterocyclylalkyl, $C_1$-$C_{13}$heteroaryl, or $C_3$-$C_{30}$heteroarylalkyl, among others;

In some embodiments, the crosslinkable chlorosilane precursor is mono-trichlorosilyl ($C_M$—Si), or 1,6-bis(trichlorosilyl)hexane (C6-Si), or 1,10-bis(tricholorosilyl)decane with 10 spacers ($C_{10}$—Si), with the formulas of:

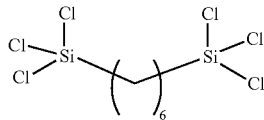

Crosslinkable chlorosilane with 6 spacers (C6-Si)
or

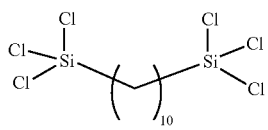

Crosslinkable chlorosilane with 10 spacers (C10-Si)
or

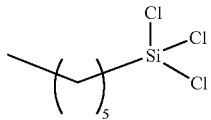

Crosslinkable chlorosilane with mono-trichlorosilyl ($C_M$—Si)

These crosslinkable chlorosilane precursors are all referred as C—Si in the following paragraphs.

The disclosed thermally stable and solvent resistant conductive polymer composite comprises a host conjugated polymer (CP) which comprises a p-type conjugated polymer with an oxidation potential lower than 0.4 V vs. Ag/AgCl.

Various embodiments described here are involved with the different host CPs which can form the disclosed thermally stable and solvent-resistant electrochromic conjugated polymer composites with crosslinked siloxane networks. In some embodiments, the host CPs comprises dioxythiophene copolymers which contained solubilizing 3,4-propylenedioxythiophene (ProDOT) units and electron rich 3,4-ethylenedioxythiophene (EDOT) units with a formula of

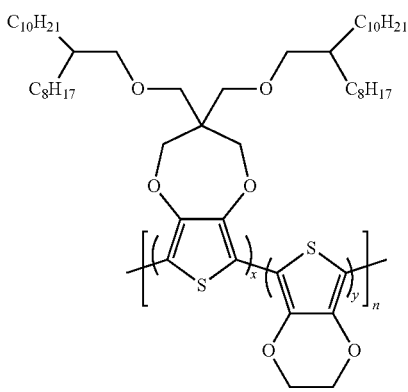

wherein x is an integer greater than 0; y is an integer equal to or greater than 0; n is an integer greater than 0; The values of x, y indicate ratios of two monomer units, but not necessarily the real monomer sequence in the polymer. This means the reaction might be ordered polymerization or random polymerization. The host CP comprises $ProDOT_x$-$EDOT_y$ ($P_xE_y$) with the average ratio of y:x ranging from 0 to 10. An example $P_xE_y$ polymer is $PE_3$, which sequence can be, for example, PE-PEEEE-PEE-PEEEEE-PEEE . . . with average ratio of y:x is 3 for random polymerization and PEEE-PEEE-PEEE-PEEE-PEEE . . . for ordered polymerization. In some embodiments, the host CPs comprises a dioxythiophene copolymers $P_xE_y$ with x=1, and y=1, 2 or 3, corresponding to $PE_1$, $PE_2$ and $PE_3$, respectively.

EXAMPLES

1. Ability to Form Crosslinked Siloxane Network

Various following embodiments are involved with the crosslinkable 1,6-bis(trichlorosilyl)hexane (referred as $C_6$—Si in the following paragraphs) as an example crosslinkable silane precursor with at least three chlorine groups, and the host CPs comprises dioxythiophene random copolymers which contain one solubilizing 3,4-propylenedioxythiophene (ProDOT) unit and three electron rich 3,4-ethylenedioxythiophene (EDOT) units with a formula of $ProDOT_1$-$EDOT_3$ ($PE_3$) as an example host CP. For comparison, two noncrosslinkable silane precursors with one or two chlorine groups which cannot form crosslinked siloxane network are also evaluated. The silane precursor with two or one chlorine groups is separately referred to linear silane precursor ($L_6$-Si) or flowable silane precursor (F—Si). The formulas of $L_6$-Si and F—Si are shown as follow:

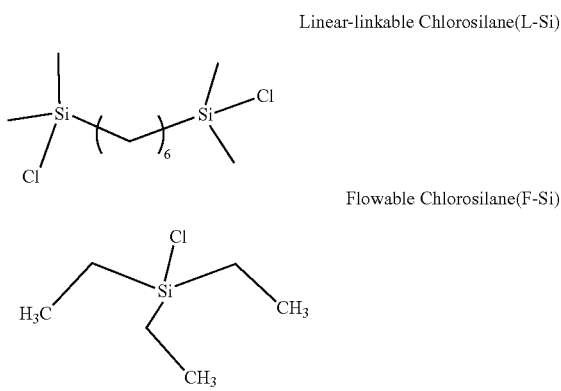

Figure 3A:
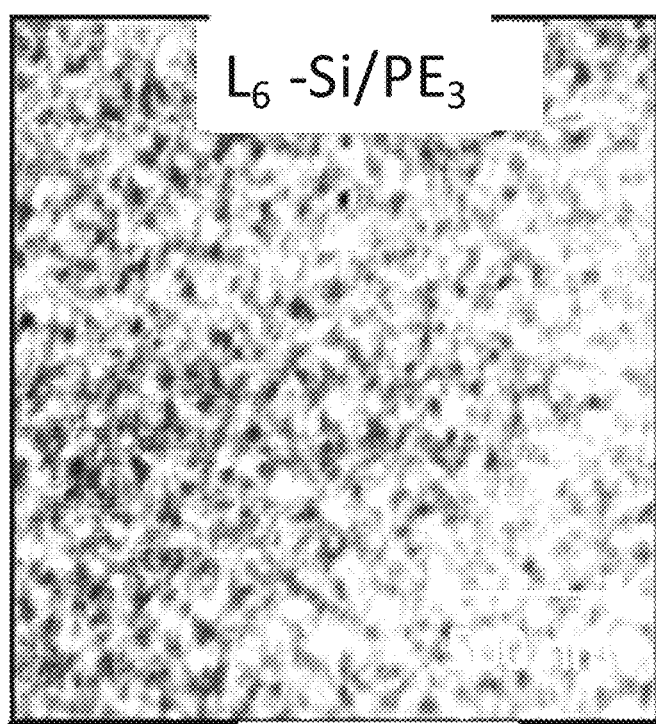
FIGS. 3(A)-(B) contain AFM phase images of $L_6$-Si/$PE_3$ (FIG. 3 (A)) and F—Si/$PE_3$ (FIG. 3 (B)).
Figure 3B:
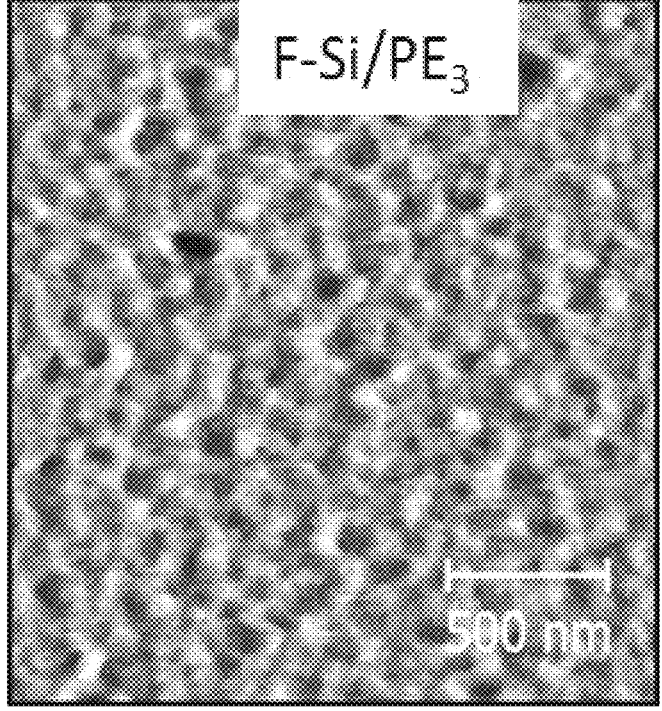
Figure 4:
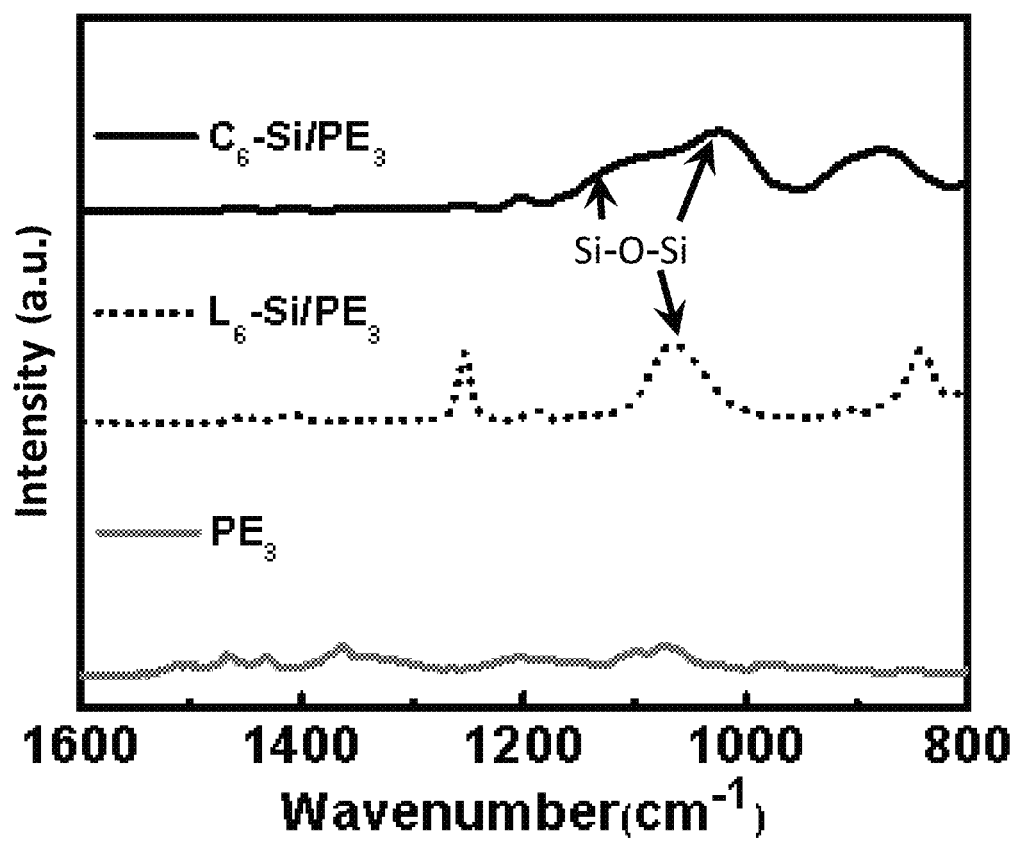
FIG. 4 shows IR spectra of $C_6$—Si/$PE_3$, $L_6$-Si/$PE_3$ and pure $PE_3$ thin films.
Figure 5:
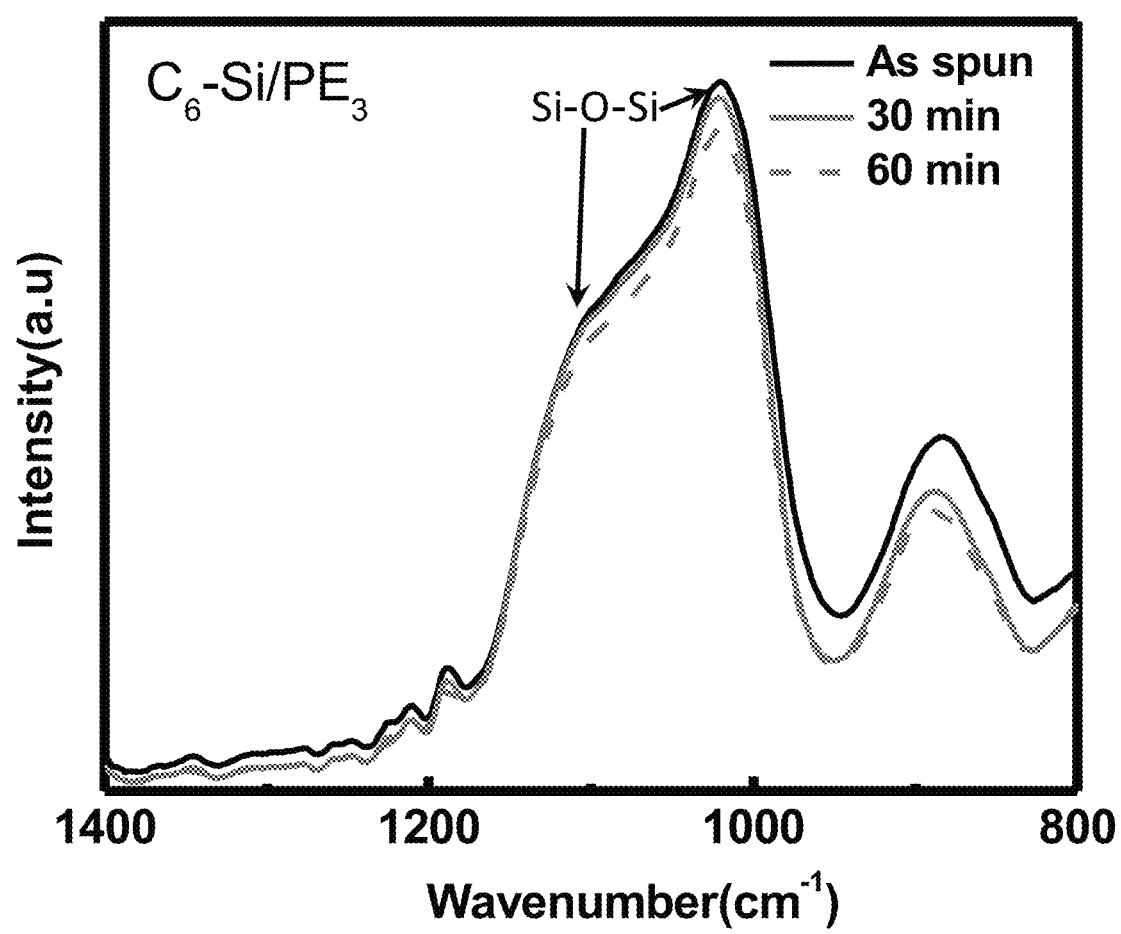
FIG. 5 shows IR spectra of $C_6$—Si/$PE_3$ composites thin film as spun, after annealing at 373K for 30 minutes, and after annealing at 373 K for 60 minutes.

Atomic force microscopy (AFM) phase images of the pure conjugated polymer $PE_3$ and the conductive polymer composites thin film formed with different silane precursors $C_6$—Si, $L_6$-Si, and F—Si are shown in FIG. 2 (A)-(B) and FIG. 3 (A)-(B). As shown in FIG. 2 (B), the conductive polymer composite formed from $PE_3$ and $C_6$—Si displays obvious phase separation between the conjugated polymers while pure $PE_3$ do not. On the other hand, FIG. 3 (A)-(B) show that both composite thin films from $L_6$-Si/$PE_3$ and F—Si/$PE_3$ do not show obvious phase separation. This indicates that although $L_6$-Si can form a linear matrix which might twist and wind within the host and F—Si can form a flowable matrix during film processing, they cannot form crosslinked network by condensation reactions inside the entire composites. The formation of cross-linked siloxane network in the $C_6$—Si/$PE_3$ composites is further confirmed by monitoring the presence of the IR bands at about 1050 $cm^{-1}$ and 1150 $cm^{-1}$, which represent characteristics of Si—O—Si stretching vibrations shown by the arrows in FIG. 4. Due to the lack of trichlorosilyl groups that form crosslinked network during condensation reactions, $L_6$-Si and F—Si composites form a linear matrix and a flowable matrix, thus less Si—O—Si stretching vibrations bands in the IR spectra. When the host CP solution is mixed with the silane precursor solution, the conductive polymer composite is already spontaneously formed in the solution. After being coating into a thin film, annealing treatment at 393K is applied to the thin film. Intriguingly, the temperature dependent in-situ IR spectrum of $C_6$—Si/$PE_3$ composites overlapped well before and after thermal annealing at 393 K as shown in FIG. 5, indicating a cross-linked siloxane network formed simultaneously at room temperature.

2. Effect of Silane Precursor Concentration on the Electrical Performance

Figure 6:
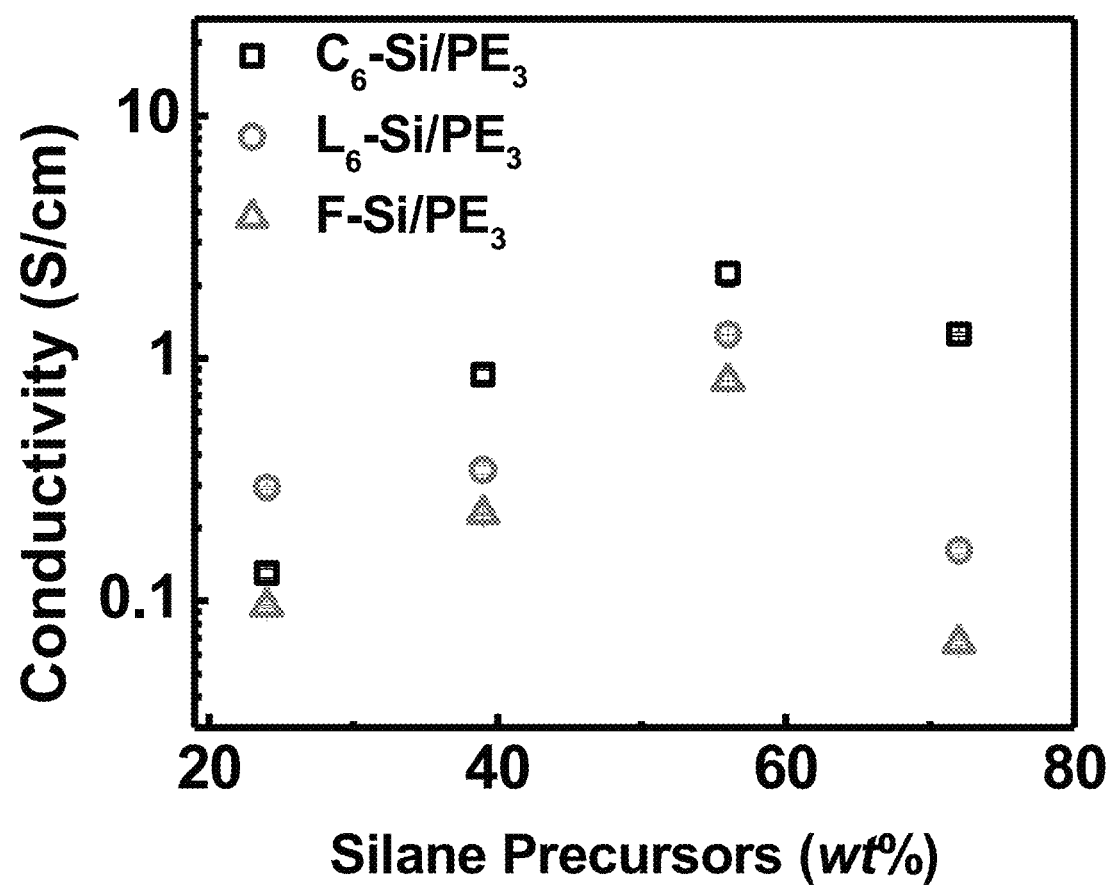
FIG. 6 is a diagram illustrating conductivity comparison of three silane/$PE_3$ composites ($C_6$—Si/$PE_3$, $L_6$-Si/$PE_3$ and F—Si/$PE_3$) at different silane precursor concentrations.
Figure 7A:
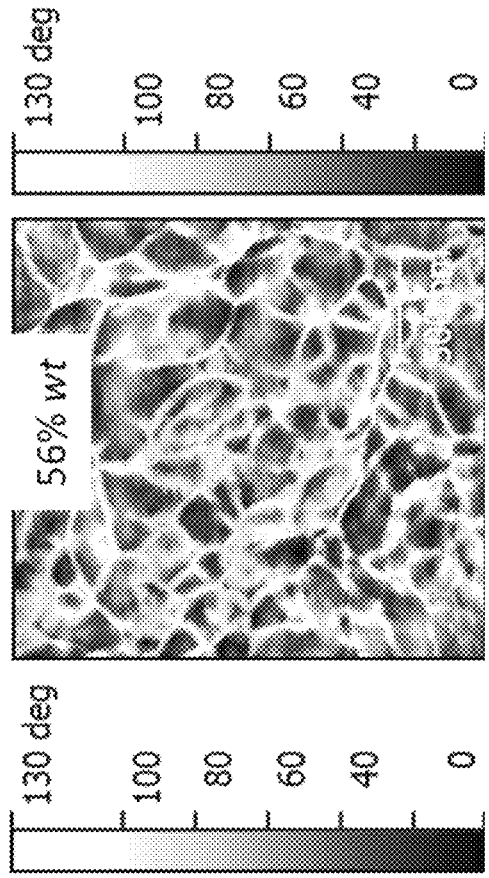
FIGS. 7(A)-(D) are AFM phase images of $C_6$—Si/$PE_3$ composites with different concentrations of $C_6$—Si, about 72% wt (FIG. 7 (A)), about 56% wt (FIG. 7 (B)), about 39% wt (FIG. 7 (C)) and about 24% wt (FIG. 7 (D)).
Figure 7B:
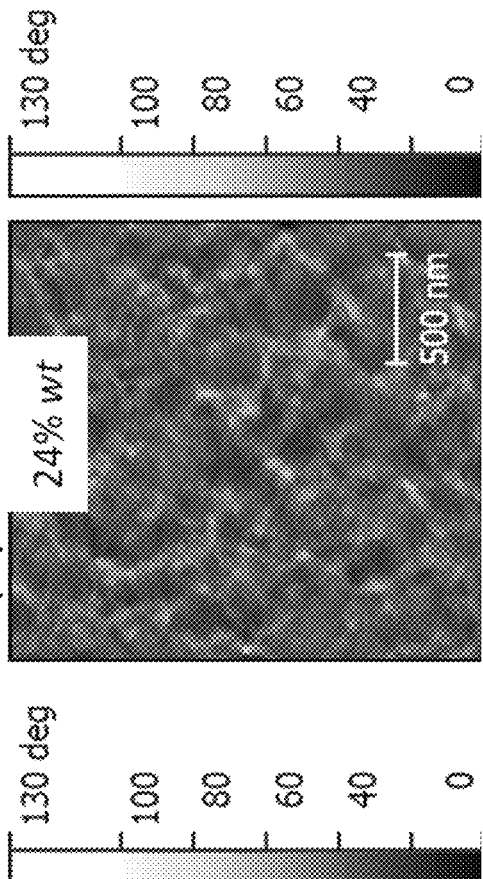
Figure 7C:
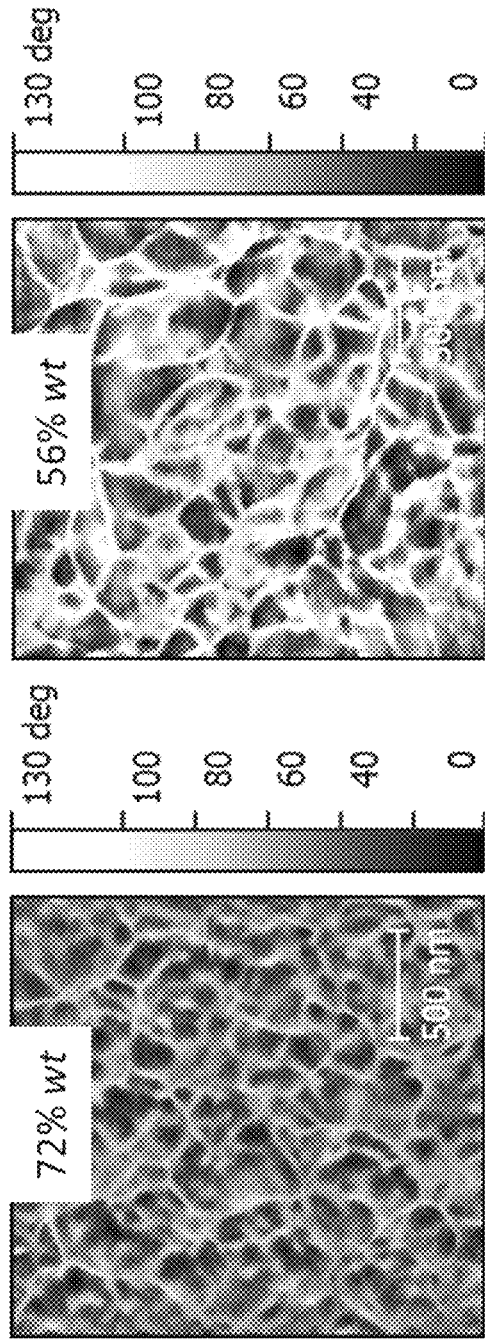
Figure 7D:
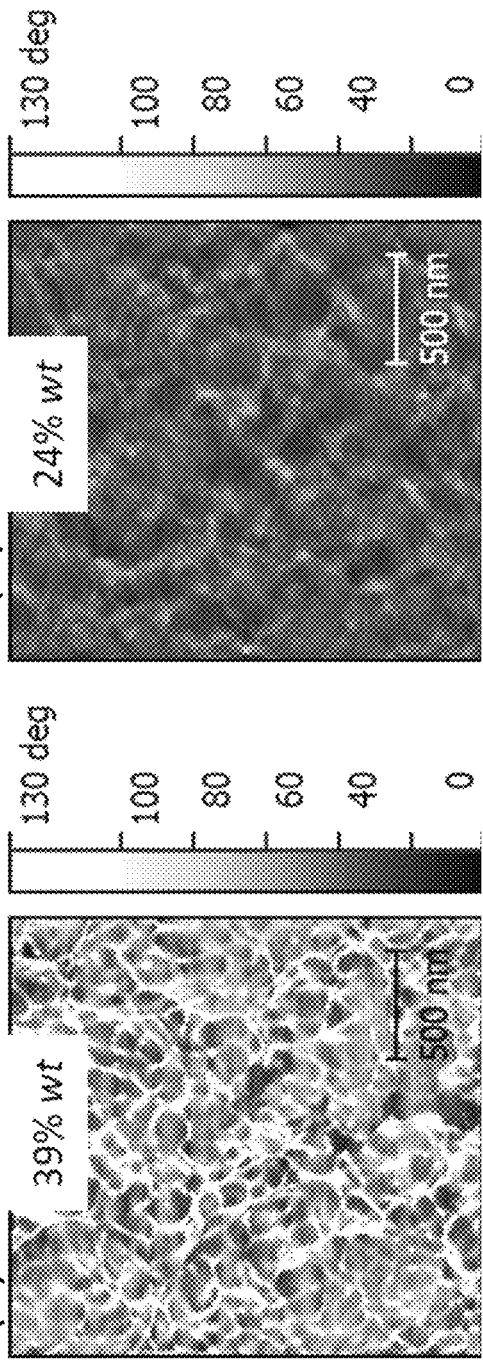

Concentrations of silane precursor have great effect on the electrical performance of conductive polymer composites. However, conductive polymer composites with different silane precursors and conjugated polymer may have different optimal concentrations. Here, efforts are made as a model to investigate the influence of specific silane precursor ($C_6$—Si, $L_6$-Si, and F—Si) concentration on the electrical performance of the conductive polymer composites with specific conjugated polymer ($PE_3$). The conductivities of three different conductive polymer composites $C_6$—Si/$PE_3$, $L_6$-Si/$PE_3$ and F—Si/$PE_3$ with different concentrations of silane precursors are shown in FIG. 6. For better presentation of the difference among different concentration, the conductivities are displayed in log scale. Among various contents of silane precursors, all three conductive polymer composites show the highest conductivity with about 56% wt silane precursors. The conductivity of $PE_3$ is only $10^{-6}$ S/cm, while those of all three conductive polymer composites are mostly above 0.1 S/cm. This greatly improved conductivities are attributed to the presence of chlorine (a p-type dopant) and silanol (a well-known electron trap). This is further confirmed by the most abundant phase separation observed for $C_6$—Si/$PE_3$ with about 56% wt of silane precursor as shown in the phase AFM images in FIG. 7 (B). Excess silane precursors lead to a scarcity of conductive domains in the composites, so the conductivities drop for all three composites with about 72% wt silane precursors in FIG. 6, which may due to the insufficient and isolated conducting domains in the composites, as shown in FIG. 7(A). In addition, among three different silane precursors (crosslinkable $C_6$—Si, noncrosslinkable $L_6$-Si and non-crosslinkable F—Si), the highest conductivity increase (up to 6 orders) is achieved for about 56% wt $C_6$—Si/$PE_3$ while lower conductivity increase is achieved for both $L_6$-Si/P and F—Si/PE$_3$. With the same 56% wt of silane precursors, the $C_6$—Si/PE$_3$ composite with crosslinked network introduces the most abundant chlorine species among three different composites, therefore displays the highest conductivity. Since about 56% wt silane precursor demonstrates to generate the best electrical performance of conductive polymer composites, about 56% wt silane precursor is used for all the following experiments as long as no other concentration is particularly specified.

3. Doping Process

Figure 8:
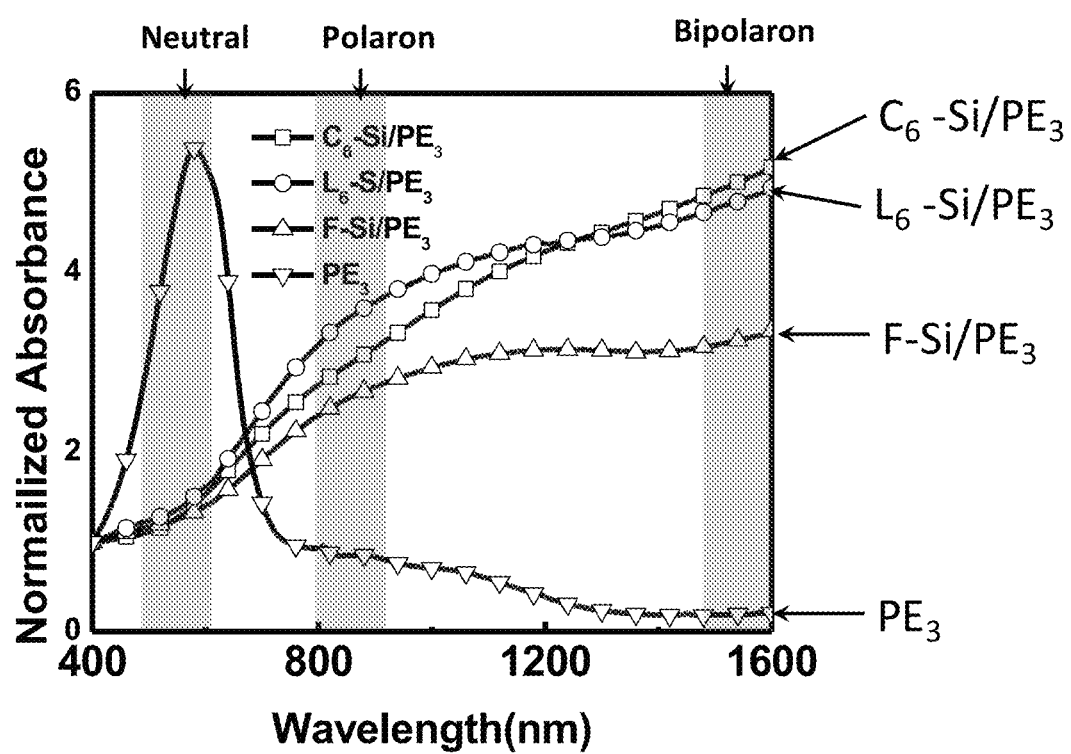
FIG. 8 is a diagram illustrating normalized UV-vis absorption spectra of composite thin films of pure $PE_3$, $C_6$—Si/$PE_3$, $L_6$-Si/$PE_3$, and F—Si/$PE_3$.

UV-vis absorption spectrum of pure PE$_3$ and three conductive polymer composites $C_6$—Si/PE$_3$, $L_6$-Si/PE$_3$ and F—Si/PE$_3$ with about 56% wt silane precursors is used to monitor the doping process, as shown in FIG. 8. Each spectrum is normalized to the absorbance at 400 nm respectively. When mixing the host CP and silane precursors, doping process simultaneously happens between the doping agents from silane precursors and the host CP while crosslinked siloxane network forms. Here, the chlorine group functions as the doping agent. There are three critical peaks (neutral absorption band at ~550 nm, polarons peak at ~850 nm, bipolarons peak at ~$\lambda_{max}$), as shown in the shaded wavelength range in FIG. 8. The neutral absorption band at ~550 nm is usually related to the band gap energy needed to excite an electron from the valence band to the conduction band. The decrease of the neutral peaks indicates the elevation of polymer conductivity caused by the doping process. The polarons peak (~850 nm) and the bipolarons peak (~$\lambda_{max}$) are often used to denote the generation of different charge carriers along the polymer backbone upon doping. The neutral absorption peaks at ~550 nm decreases for all three silane/PE$_3$ composites when compared with PE$_3$ polymer, which indicates the doping process happens to all three composites. The increases of both polaron peaks and bipolaron peaks further demonstrate the formation of doping process for all three composites. FIG. 8 also shows both polaron peak and bi-polaron peak for $C_6$—Si/PE$_3$ composite increase most and then $L_6$-Si/PE$_3$ and then F—Si/PE$_3$, which increase order is corresponding to the abundance order of the chlorine groups from silane precursors. The more chlorine group, the more doping effect and the more increase of both polaron peak and bi-polaron peak.

Figure 9:
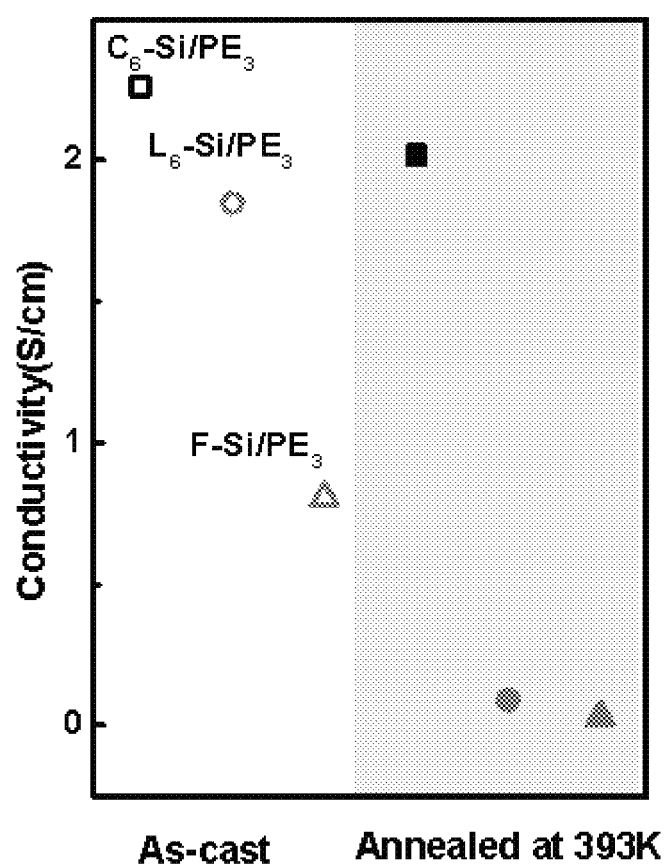
FIG. 9 is a diagram illustrating conductivity comparison of different silane/$PE_3$ composites before (left) and after (right) annealing at 393K.

4. Thermal Stability Introduced by Crosslinked Siloxane Network and Abundant Doping As stated above, three different techniques (AFM, IR and UV-vis absorption) all demonstrate both crosslinked siloxane network and more doping process happen to the conductive polymer composite ($C_6$—Si/PE$_3$) with crosslinkable silane precursor when compared with other composites ($L_6$-Si/PE$_3$ and F—Si/PE$_3$) formed from non-crosslinkable silane precursor and less chlorine doping agents. Correspondingly, the thermal stability of these three composites are examined to investigate the thermal stability impact from the crosslinked siloxane network and abundant doping process. Cl$^-$ anions can easily diffuse out from the non-thermal stable system after being annealing at 373 K, leading to decreased conductivity. If the composite has good thermal stability, its conductivity will not change much after heating. Thus, the conductivity changes before and after being thermal annealing at 373 K for 1 hour are examined for $C_6$—Si/PE$_3$, $L_6$-Si/PE$_3$ and F—Si/PE$_3$ with about 56% wt silane precursors. As shown in FIG. 9, after one hour of annealing at 373 K, only $C_6$—Si/PE$_3$ composites remain high stable conductivity as it still maintains more than 90% of the original electrical conductivity, while the other composites with linear and flowable matrices barely exhibited conductive behavior. This result demonstrates the great thermal stability introduced by crosslinked siloxane network along with the doping process, which is barely achieved by linear or flowable silane matrices. Since the doping agents come from the silane precursors, the doping process happens simultaneously together with the crosslinking process. In this specification, the process for both the doping and the crosslinked siloxane network formation may be simplified as the process for the crosslinked network formation.

Figure 10A:
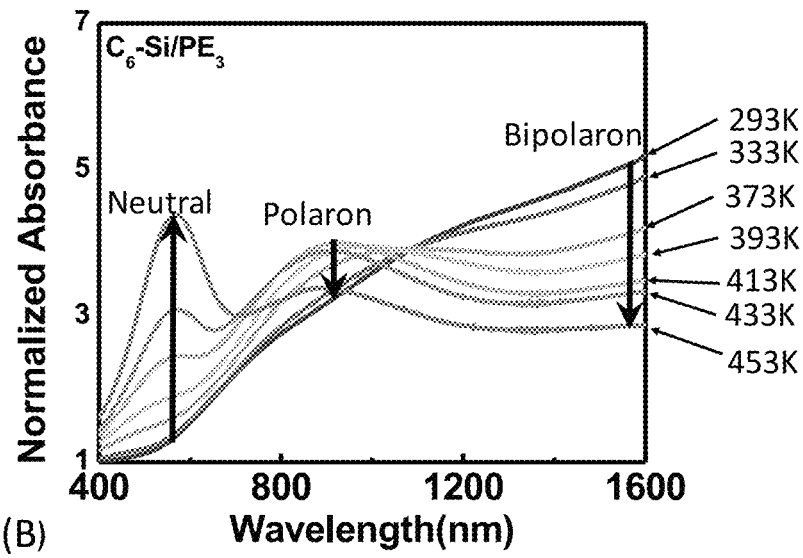
FIGS. 10(A)-(C) are diagrams illustrating normalized in-situ UV-Vis absorption spectra of different silane/$PE_3$ composites with temperatures increased from 293 K to 453 K.
Figure 10B:
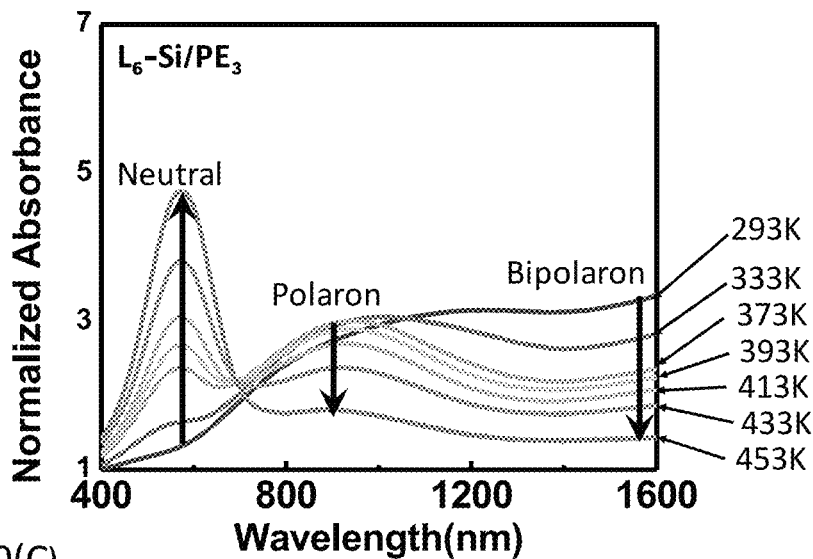
Figure 10C:
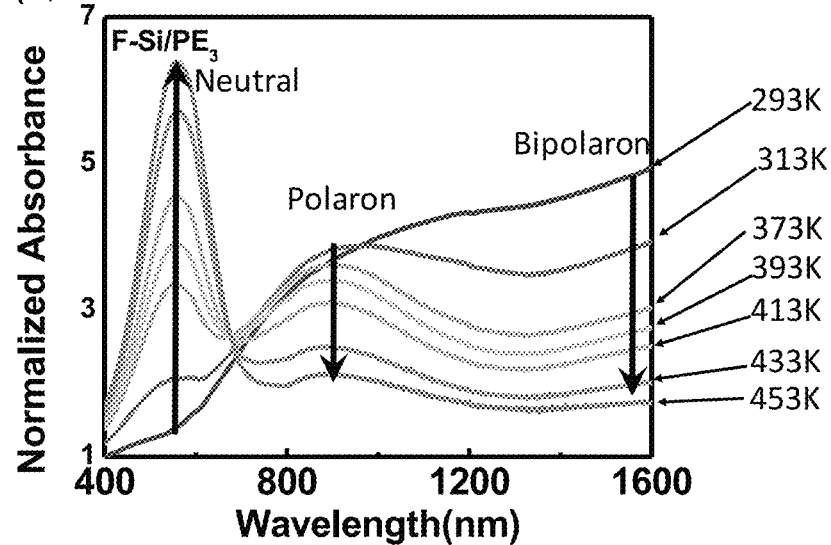

The electrical thermal stability is further investigated by monitoring the de-doping process in the composites at elevating temperatures by the in-situ temperature dependent UV-vis absorption spectra of three composites ($C_6$—Si/PE$_3$, $L_6$-Si/PE$_3$, F—Si/PE$_3$) at various temperatures from 293 K to 453 K as shown in FIGS. 10 (A)-(C). For each conductive polymer composite thin film, absorbance values at different temperatures are all normalized to the absorbance of 400 nm at 293K. As shown in FIG. 10 (A), at room temperature, $C_6$—Si/PE$_3$ composite shows a broad signal at $\lambda_{max}$ (~1600 nm) which is attributed to the bipolaron absorption. As the temperature increases, the bipolaron absorption peak at $\lambda_{max}$ (~1600 nm) keeps decreasing, and the polaron peak at $\lambda$=~850 nm emerges higher and higher from 373K, 393K to 413K and then slightly decreases (but remains higher than that at 373K) after temperature further increases to 433K and 453K. Meanwhile, the neutral peaks at ~550 nm keeps increasing when the temperature increases. The increasing of polaron peak before 413K may be due to the generation of polaron from bipolaron is greater the degeneration of polaron. When temperature increases to 433K, the degeneration of polaron dominate the de-doping process, which lead to the slight decrease of polaron peak. The neutral peaks at ~550 nm normally dominate when the conjugated polymer is not doped. The reducing bipolaron peak at ~1600 nm along with the increasing neutral peak at ~550 nm indicates the effect of de-doping process. When comparing FIGS. 10 (A)-(C), much higher bipolaron and polaron peaks, as well as much lower neutral peak are observed for $C_6$—Si/PE$_3$ than those from $L_6$-Si/PE$_3$ and F—Si/PE$_3$ composites at all testing temperatures, indicating greater conductivities of $C_6$—Si/PE$_3$ at the testing temperatures. Meanwhile, smaller decreases of polaron and bipolaron peaks as well as smaller increase of neutral peak happen to $C_6$—Si/PE$_3$ than those from $L_6$-Si/PE$_3$ and F—Si/PE$_3$ composites. The insignificant changes of the polaron, bipolaron, and neutral peak intensity demonstrate the thermal stability of $C_6$—Si/PE$_3$ composites.

Figure 11:
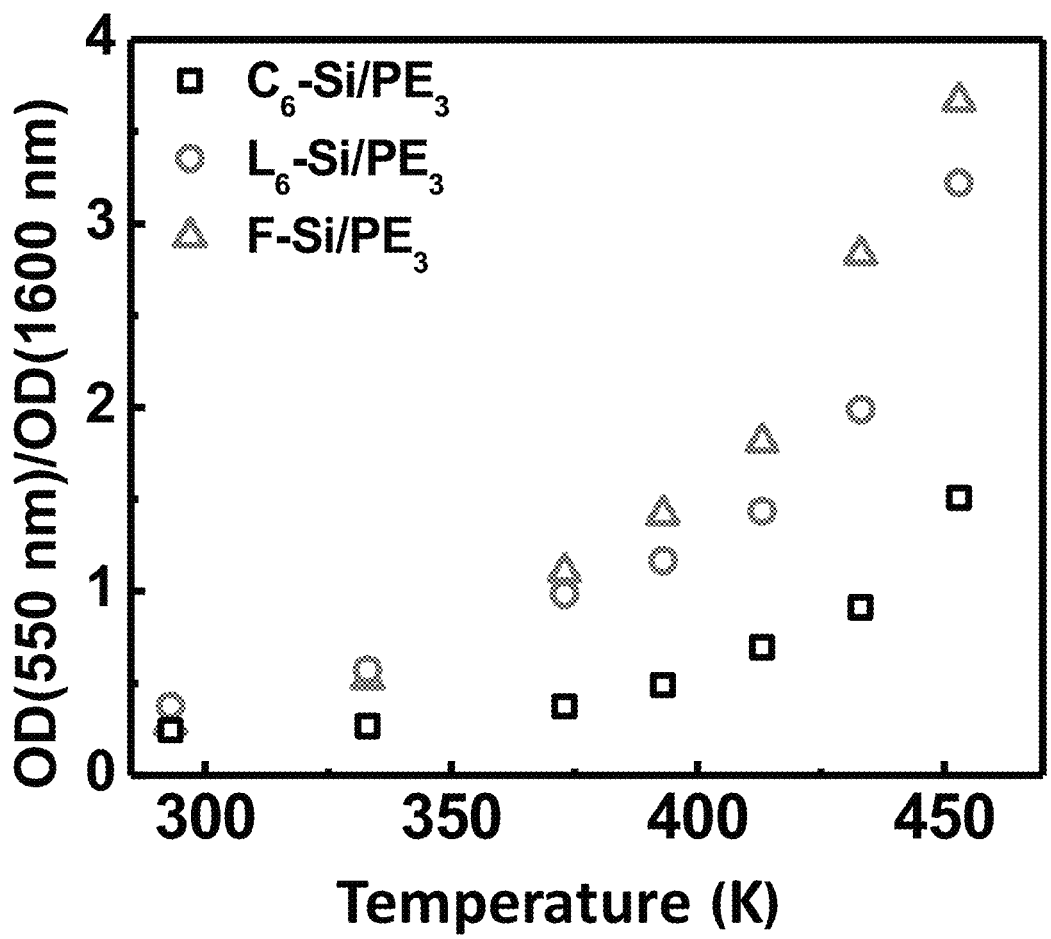
FIG. 11 is a diagram illustrating optical density ratio (OD at 550 nm/OD at 1600 nm) comparison for different silane/$PE_3$ composites at elevating temperatures.

Since the intensities of bipolaron peaks and neutral peaks more directly reflect the conductivities of the composites, an optical density ratio between the neutral peak (~550 nm) and bi-polaron peak (~1600 nm) is used to indicate the conductivity and thermal stability of the composites. The smaller the optical density ratio of the composites, the higher conductivity of the composites. With the increasing temperatures, the smaller the optical density ratio change of the composites, the higher thermal stability of the composites. The optical density ratio changes for three silane/PE$_3$ composites (C6-Si/PE$_3$, $L_6$-Si/PE$_3$, F—Si/PE$_3$) at various elevating temperatures are further evaluated. As shown in FIG. 11, $C_6$—Si/PE$_3$ composite displays the smallest ratios as well as the smallest ratio changes with increased temperatures, which indicates that $C_6$—Si/PE$_3$ composite has the most thermal stability among three composites. As stated above, only $C_6$—Si/PE$_3$ composite forms the crosslinked siloxane network. The crosslinked siloxane network in the composites effectively confines the doped polymer and limits the mobility of doped polymer chains, thus, it greatly reduces the morphology change and the diffusion of dopants at high temperatures, thus endows the resulting conductive polymer composite great thermal stability.

Figure 12:
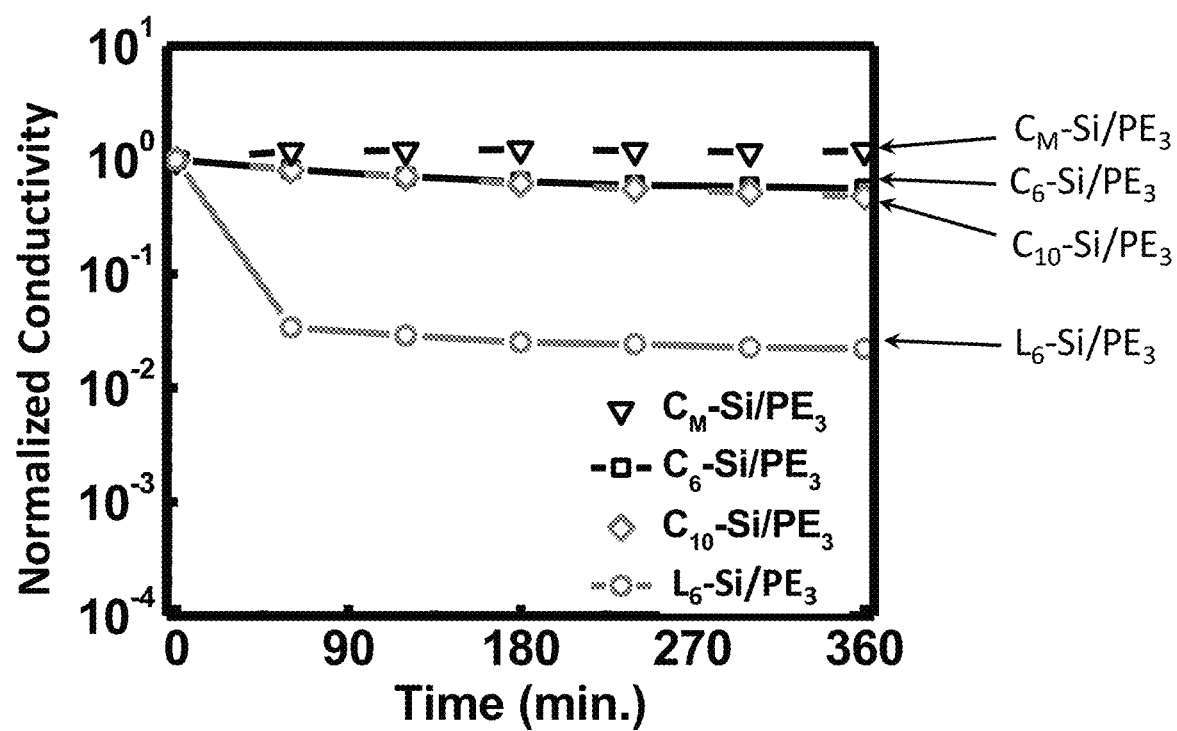
FIG. 12 is a diagram illustrating normalized conductivity of different silane/$PE_3$ composites at 353K for 6 hours.

5. Impact of the Spacer Carbon Numbers in Crosslinkable Silane Precursors on the Thermal Stability of the Composites The increased rigidity of the crosslinked networks can be controlled by the spacer carbon numbers in the crosslinkable silane precursors, leading to further improved thermal stability of the composite. To investigate the impact of different spacer carbon numbers in crosslinkable silane precursors on the thermal stability of the composites, two other crosslinkable chlorosilanes, hexyltrichlorosilane with mono-trichlorosilyl ($C_M$—Si) and 1,10-Bis(tricholorosilyl)decane with 10 spacers ($C_{10}$—Si) are compared with $C_6$—Si. The conductivities of three types of composites are examined in situ at 353K for 6 hours, as show in FIG. 12. All data are normalized to the corresponding conductivity at time zero. For better presentation, the normalized conductivities are displayed in log scale. As a control, non-crosslinkable silane precursor $L_6$-Si is also compared. As shown in FIG. 12, the conductivity of $L_6$-Si/$PE_3$ drops dramatically in the first hour for almost 2 orders, and remains about 5% of the as-spun conductivities in the pro-longed thermal stress. On the other hand, all the three C—Si/$PE_3$ composites show insignificant conductivity changes. The $C_6$—Si/$PE_3$ and $C_{10}$/$PE_3$ composites with flexible spacers in the siloxane network drop to about 60% of their as-spun conductivities, whereas $C_M$—Si/$PE_3$ composites maintain their as-spun conductivity. The superior thermal stability of $C_M$—Si composite is attributed to its most rigid crosslinked network without flexible spacers in the silane precursors. The great drop of conductivity for $L_6$-Si/$PE_3$ composites indicates the bad thermal stability due to the lack of crosslinked siloxane network.

Figure 13A:
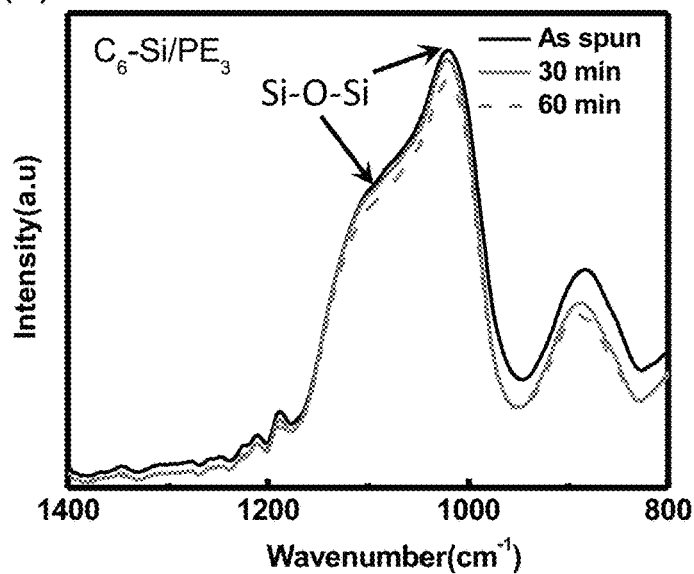
FIGS. 13(A)-(C) are diagrams illustrating IR spectra of $C_6$—Si/$PE_3$ composites (FIG. 13(A)), $C_{10}$—Si/$PE_3$ composites (FIG. 13(B)) and $C_M$—Si/$PE_3$ composites (FIG. 13(C)) before annealing (as spun), after annealing at 373 K for 30 minutes, and after annealing at 373 K for 60 minutes.
Figure 13B:
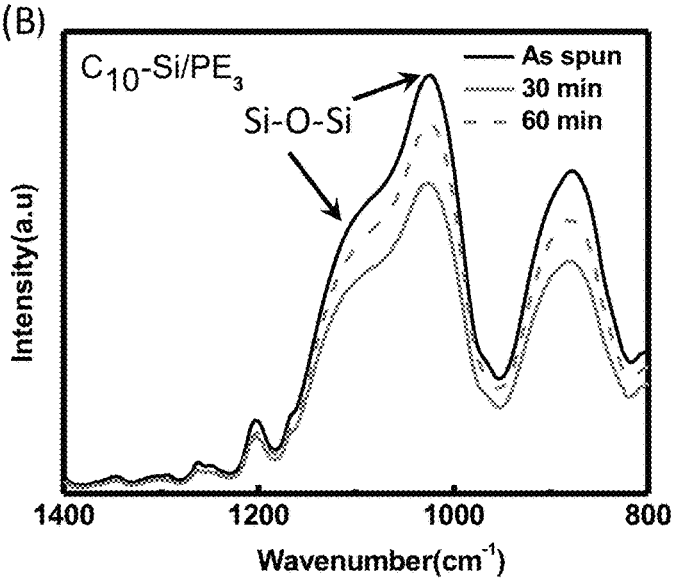
Figure 13C:
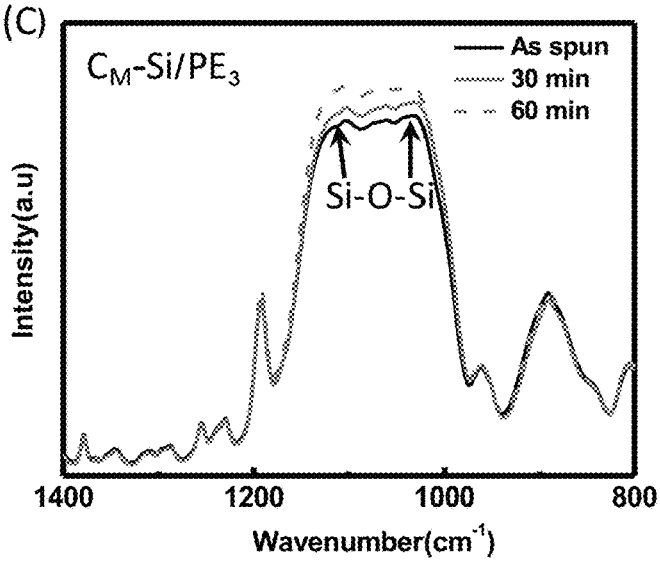

The effects of the number of spacer carbon on the thermal stability of the disclosed conductive polymer composite thin film are further evaluated by the presence of the IR bands at about 1050 cm$^{-1}$ and 1150 cm$^{-1}$, which correspond to the Si—O—Si stretching vibrations. IR spectra for three conductive polymer composite, $C_6$—Si/$PE_3$, $C_0$—Si/$PE_3$, and $C_M$—Si/$PE_3$ are compared before and after thermal annealing at 393 K for 30 mins and 60 mins, as shown in FIGS. 13 (A)-(C). Although all three composites exhibit clear IR bands about 1050 cm$^{-1}$ and 1150 cm$^{-1}$, shown by the arrows. $C_M$—Si/$PE_3$ composites show the broadest Si—O—Si bands between 1050-1150 cm$^1$, which indicates the most abundant siloxane network. Furthermore, the IR spectra of $C_M$—Si/$PE_3$ composites before and after 393K thermal stress overlap with each other, indicating the greatest thermal stability $C_M$—Si silane precursor introduces to the resulting composite. Overall, due to the greatest thermal stability $C_M$—Si silane precursor introduces to the resulting composite, $C_M$—Si silane precursor is used for the following experiments.

6. Effect of Different Host CPs on Electrical Performance and Thermal Stability

Figure 14:
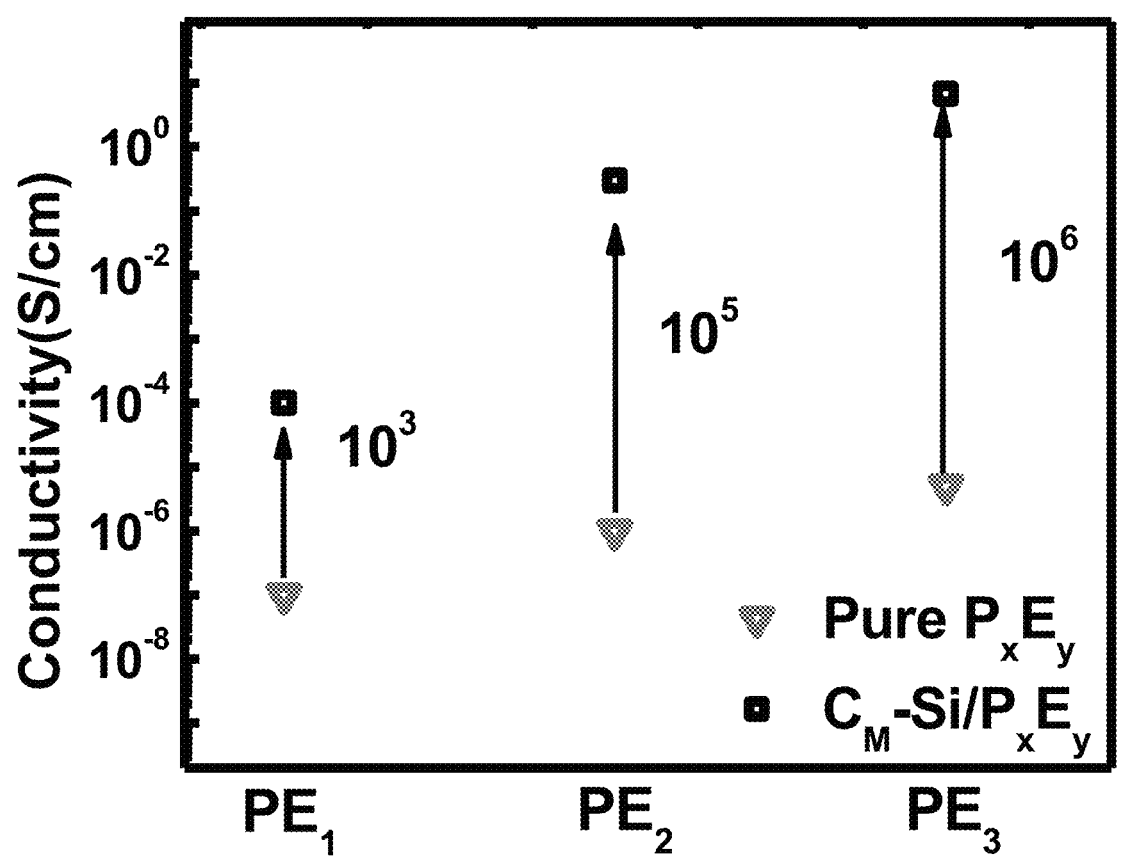
FIG. 14 is a diagram illustrating conductivity comparison of different polymers $P_xE_y$, host CPs ($PE_1$, $PE_2$, and $PE_3$) and their conductive polymer composites $C_M$—Si/$P_xE_y$.

The electrical performance of C—Si/$P_xE_y$ composites also depends on the oxidation potential of CPs. To investigate the effect of different host CPs on the electrical performance of the disclosed conductive polymer composite thin films, composites formed with three different host CPs are compared. Those three CPs are similar dioxythiophene copolymers which contain solubilizing 3,4-propylenedioxythiophene (ProDOT) units and electron rich 3,4-ethylenedioxythiophene (EDOT) units with the formula of ProDOT$_x$-EDOT$_y$, $P_xE_y$ (x=1; y=1, 2, 3 separately for three host CPs). Conductivities of composites formed from $C_M$—Si silane precursor and different CPs ($PE_1$, $PE_2$, $PE_3$) are compared with the pure polymers' conductivity, as shown in FIG. 14. The conductivities of all three CPs greatly increase after doping with chlorosilane precursors. For better presentation, the conductivity is displayed in log scale. For the pure host CPs, $PE_1$, $PE_2$ and $PE_3$ have conductivity values about $10^{-7}$, $10^{-6}$ and $10^{-6}$ S/cm, respectively. Upon doping with $C_M$—Si by blending polymer solutions with chlorosilane precursors, the conductivities of $PE_1$, $PE_2$ and $PE_3$ increased to $10^{-6}$, $10^{-1}$ and 6 S/cm, respectively. The increasing magnitudes of conductivity for $PE_1$, $PE_2$ and $PE_3$ are $10^3$, $10^5$, $10^6$, respectively. The highest conductivity and the greatest conductivity increase upon doping are found for $PE_3$, which indicates that $PE_3$ is most likely to be doped among three PCs. This may be because the increasing EDOT content in the repeat unit of $P_xE_y$ copolymers may lower the onset oxidation potential and the electron gap (Eg) of the polymer.

Figure 15:
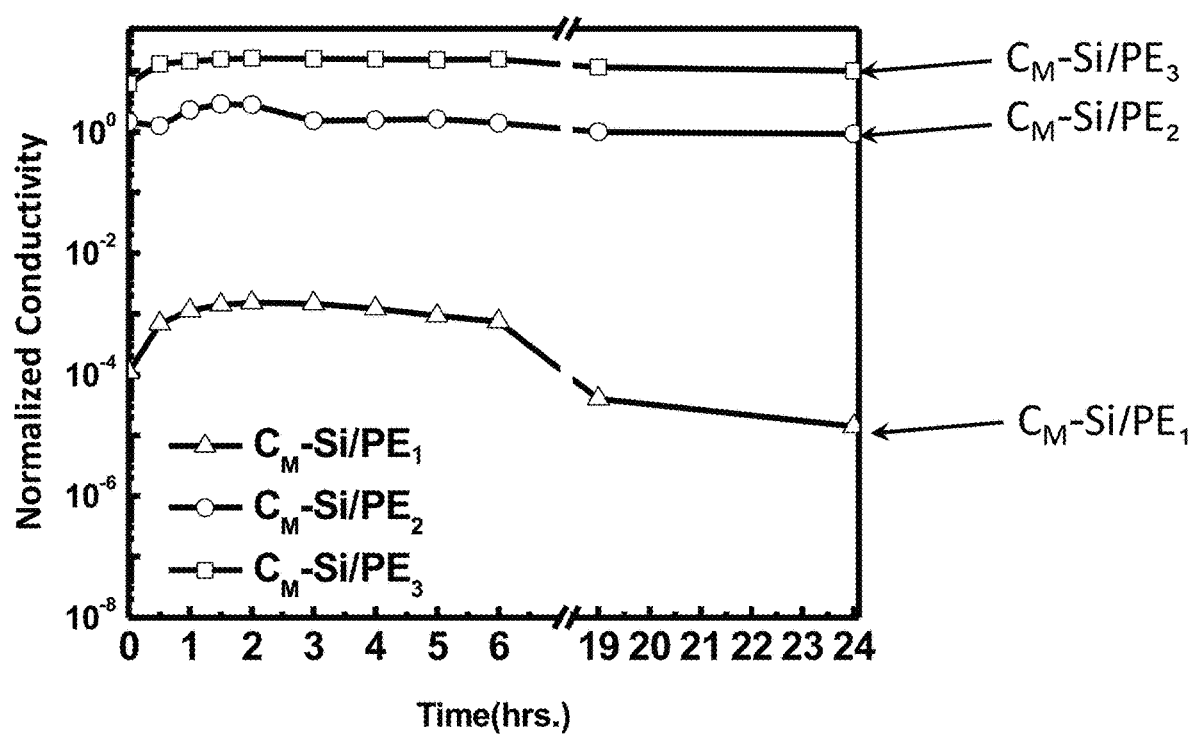
FIG. 15 is a diagram illustrating normalized conductivity comparison of $C_M$—Si/$P_xE_y$ composites with different $P_xE_y$ host CPs ($PE_1$, $PE_2$, and $PE_3$) at 353K for 24 hours.
Figure 16A:
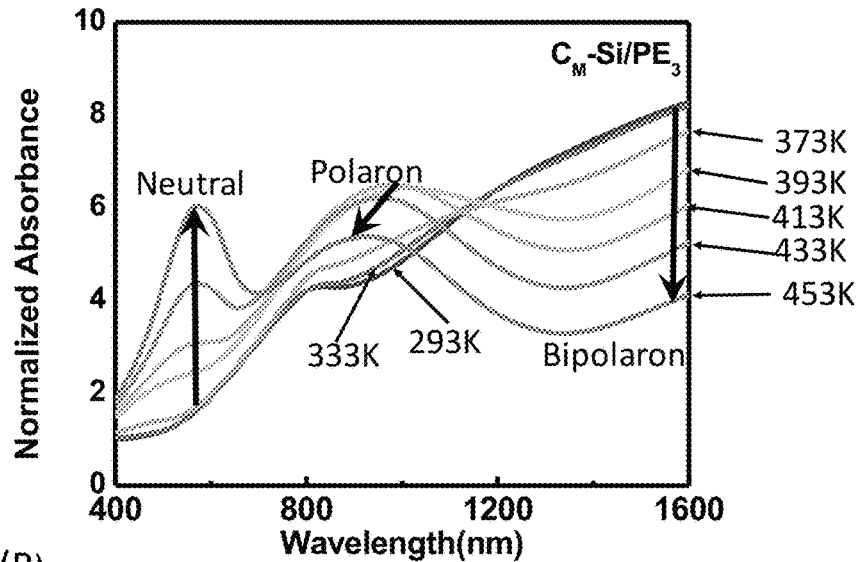
FIGS. 16(A)-(C) are diagrams illustrating normalized UV-Vis absorption spectra of $C_M$—Si/$P_xE_y$ composites with different $P_xE_y$ host polymers with temperatures increasing from 293 K to 453 K.
Figure 16B:
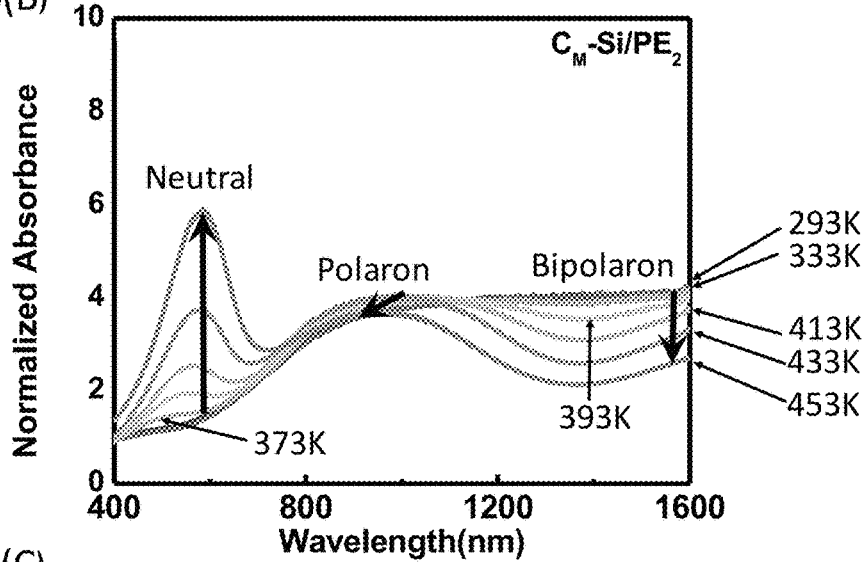
Figure 16C:
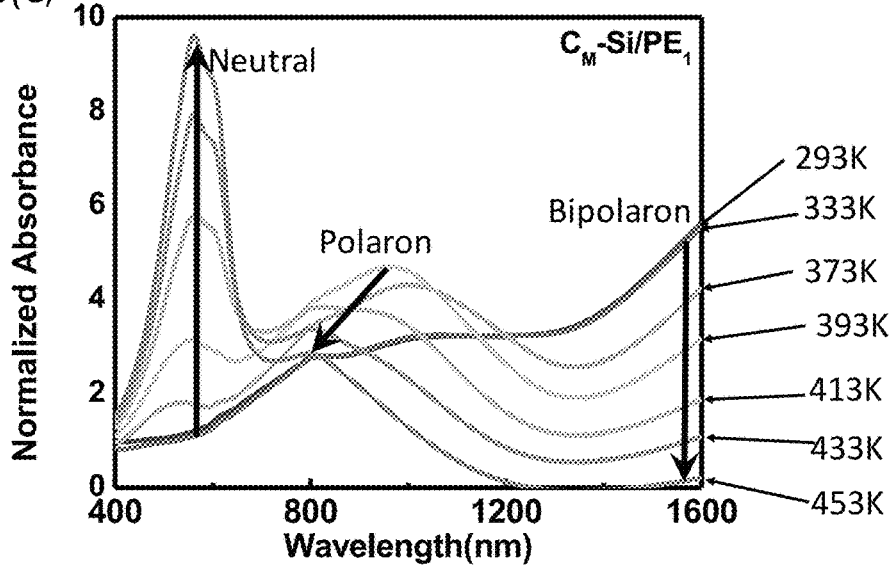

The thermal stability of the three $C_M$—Si/$P_xE_y$ composites with the same different CPs are compared by their conductivity changes under thermal stress in FIG. 15 and in-situ temperature dependent UV-vis absorption spectra in FIG. 16. FIG. 15 shows the in-situ measured normalized conductivity changes at 353K for 24 hours. All data are normalized to the conductivity of $C_M$—Si/$PE_3$ at time zero. For better presentation, the normalized conductivities are displayed in log scale. The conductivities of $C_M$—Si/$PE_2$ and $C_M$—Si/$PE_3$ remain almost the same over the 24 hour baking at 353K (over 80% of their original conductivity) while the conductivity of $C_M$—Si/$PE_1$ slightly increases in the first few hours and dramatically decreases after long time baking (19 hours) with more than 90% of its original conductivity lost. Thus, FIG. 15 indicates the $C_M$—Si/$PE_2$ and $C_M$—Si/$PE_3$ show higher thermal stability than $C_M$—Si/$PE_1$. FIGS. 16 (A)-(C) show the in-situ temperature dependent UV-vis absorption spectra of the three $C_M$—Si/$P_xE_y$ composites at various temperatures from 293 K to 453. For each conductive polymer composite thin film, spectra at different temperatures are normalized to the absorbance at 400 nm at 293K. At 293K, very high bipolaron absorption and very low natural absorption are observed for $C_M$—Si/$PE_3$ composites, which indicates $C_M$—Si/$PE_3$ has very good conductivity. Polaron absorption peak first increases from 293K to 393K, then decreases a little bit from 413K to 453K. However, the final polaron absorption at 453K still show clear peak and higher intensity than that at the initial 293K, which indicates the great thermal stability of $C_M$—Si/$PE_3$. $C_M$—Si/$PE_2$ in FIG. 17 (B) shows similar trend on absorption peak changes with increasing temperature as $C_M$—Si/$PE_3$ with lower bipolaron and polaron peaks. $C_M$—Si/$PE_1$ in FIG. 17 (C) shows even lower bipolaron and polaron band absorptions, and more drop of polaron band absorptions, indicating lower conductivity and less thermal stability. Overall, $C_M$—Si/$PE_3$ shows the best thermal stability.

7. Solvent Resistance of the Disclosed Composite Thin Film

Figure 17:
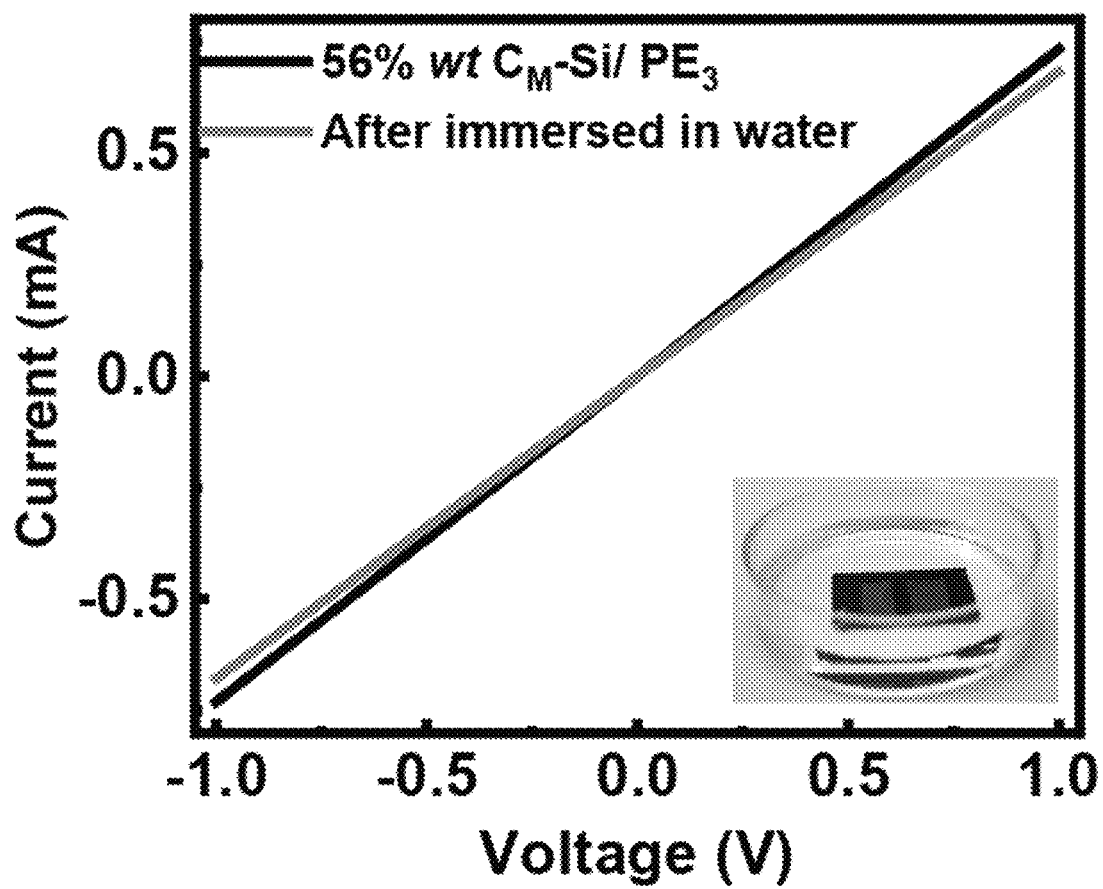
FIG. 17 shows I-V curves of $C_M$—Si/$PE_3$ thin film before and after being immersed in water for 1 hour.
Figure 18:
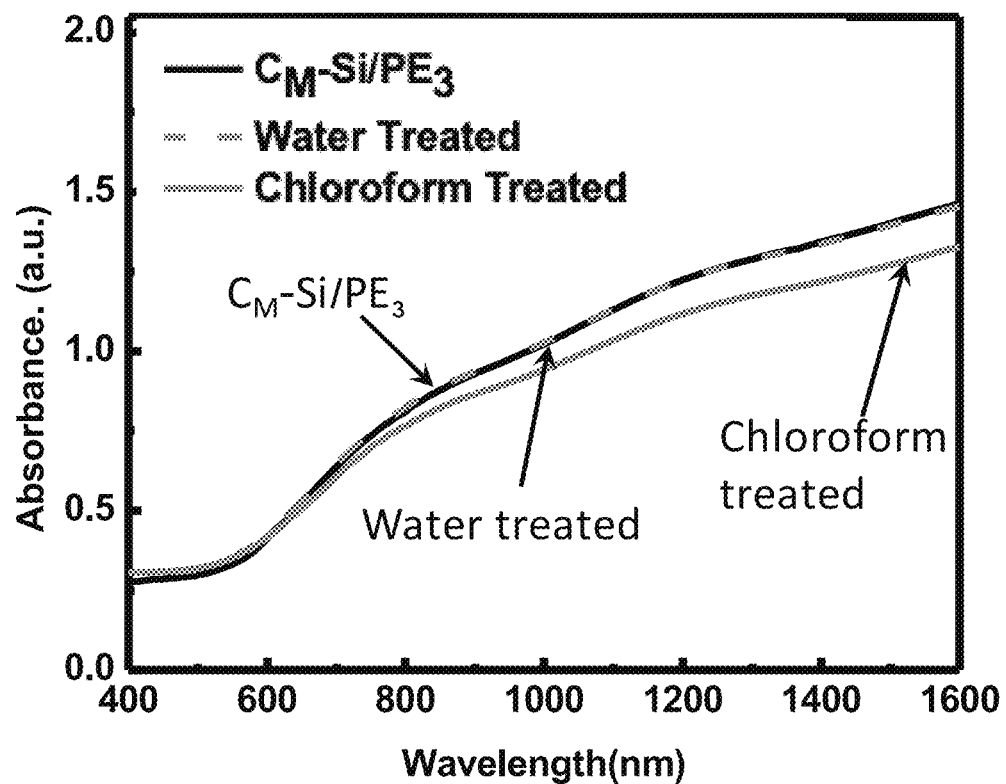
FIG. 18 is a diagram illustrating normalized UV-Vis absorption spectra of a $C_M$—Si/$PE_3$/$PE_3$ composite thin film before and after water treatment or chloroform treatment.

The disclosed conductive polymer composites not only exhibit great thermal stability, but also exhibit great water and organic solvent resistance due to the entanglement of polymers within the cross-linked siloxane network. The solvent resistance of the disclosed C—Si/$PE_3$ composites is evaluated with $C_M$—Si/$PE_3$ composite by monitoring the change of the electrical conductivity and UV-vis absorption spectra before and after being dipped into water or organic solvents which are commonly used in conductive polymer composites processing. As shown in FIG. 17, after being immersed in water for 1 hour, the I-V curve of $C_M$—Si/$PE_3$ composites (grey line) only show slightly offset from the original one before immersing in water (black line). FIG. 18 shows the UV-vis absorption spectra of $C_M$—Si/$PE_3$ composites before and after 1 hour water treatment as well as after 1 minute chloroform treatment. For each treatment, the entire spectrum is normalized to the absorbance at 400 nm. The spectra after 1 hour water treatment show less than 10% drop when compare with the original one before water treatment. In addition, $C_M$—Si/$PE_3$ composites also display great organic solvent robustness. After being dipped in chloroform, the intensities of absorption peak only slightly decreases, indicating the excellent solvent robustness of $C_M$—Si/$PE_3$ composite.

Figure 19:
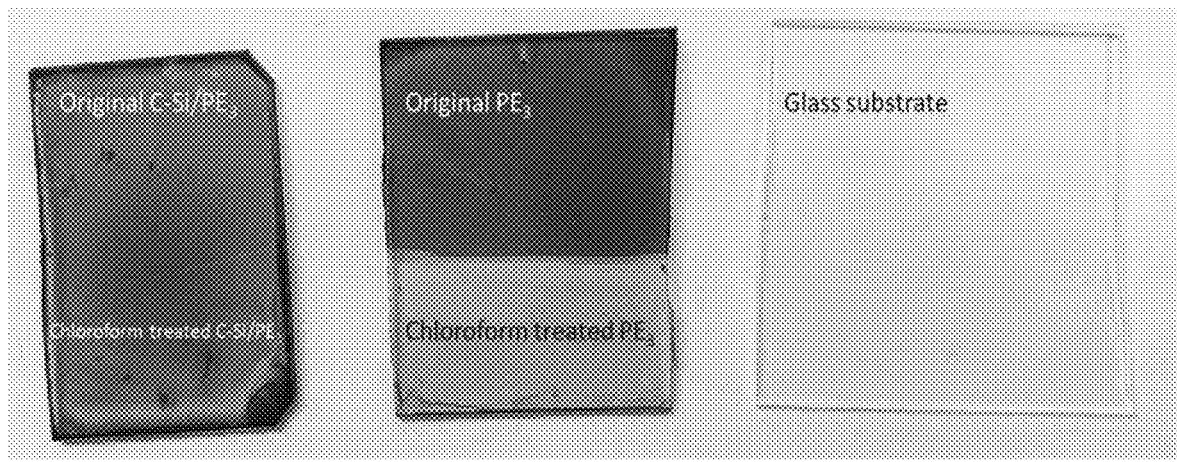
FIG. 19 contains the following images, from right to left, a glass substrate, a pure polymer $PE_3$ film on a glass substrate, a $C_M$—Si/$PE_3$ composite thin film on a glass substrate after the corresponding bottom half parts dipped in a chloroform bath.

The excellent organic solvent resistance of $C_M$—Si/$PE_3$ composite thin film can also be visualized by FIG. 19. The bottom half portions of glass substrate, pure $PE_3$ thin film and $C_M$—Si/$PE_3$ composite thin film are dipped into a bath of chloroform for 1 minute. Clear color change between the top half and the bottom half is observed for the pure $PE_3$ thin film with naked eyes, while no notable color change between two half portions is seen for both $C_M$—Si/$PE_3$ composite thin film and glass substrate under the same treatments, indicating great organic solvent resistance of the $C_M$—Si/$PE_3$ composite thin film. Similar results are also observed for another commonly used organic solvent, acetone. This again confirms the excellent solvent resistance of $C_M$—Si/$PE_3$ composite thin film.

In another aspect, the disclosure describes a method for preparation of the thermally stable and solvent-resistant conductive polymer composite.

To achieve robust electrical conductivity under elevating temperatures and/or various solvent environments of conjugated polymers, doping appears to be a promising approach. However, how to design and synthesize a simple and efficient doping method to achieve thermally stable and solvent resistant system remains quite challenging. The preparation method for the disclosed thermally stable and solvent-resistant conductive polymer composite thin film is only involved with simple mixing of conjugated polymers and crosslinkable silane precursors in ambient air under room temperature. While mixing, crosslinking and doping are simultaneously occurs, resulting the disclosed thermally stable and solvent-resistant conductive polymer composite sol-gel solution. Conventional film coating techniques can be used to easily produce the disclosed conductive polymer composite thin film.

The method comprises: providing a crosslinkable silane precursor solution in a solvent; providing a host conjugated polymer solution in a solvent; producing a composite sol-gel solution by mixing the crosslinkable silane precursor solution with the host conjugated polymer solution with a ratio of the silane precursor in a range of 0.1 to 90% wt for a reaction time up to 168 hours; an optional step of breaking the hydrogen bond with a hydrogen bond interrupting solvent and promoting the solution consistency if needed. Conventional film coating techniques can be used to coat the composite solution onto a substrate to form the disclosed thermally stable and solvent-resistant conductive polymer composite thin film.

In some embodiments, the solvent for the crosslinkable silane precursor and the solvent for the conjugated polymer are selected from one or more of aprotic solvent, such as chloroform, dichloromethane, nitromethane, toluene.

In some embodiments, the hydrogen bond interrupting solvent is a solvent which can be used to break hydrogen bond. Example hydrogen bond interrupting solvents may include alcohol and acetone.

In some embodiments, the thin-films can be processed by spin-coating. slot-die coating, spray coating, bar coating, among others known in the art.

In some embodiments, the annealing method used for the coating process includes thermal annealing, IR irradiation annealing.

In one embodiment, a method for forming a $C_6$—Si/$PE_3$ composite thin film is provided. $PE_3$ solution is prepared in dichloromethane with the concentration of 25 mg/mL $C_6$—Si solutions is prepared in dichloromethane, and the concentration is 80 mg/mL. The two solutions are blended with about 56% wt $C_6$—Si. After blending for more than 48 hrs, the blend changes to a sol-gel solution. For the purpose of film processing, 5-20 μl (preferably 10 μl) ethanol is added to the gel to break the hydrogen bonding and the mixture returned to solution state. Silane/$PE_3$ composites are deposited on the glass substrate by spin-coating at a speed of 1500 rpm for 60 seconds. After spin coating, the thin film is dried in the oven for 10 min at 353K.

In another embodiment, a method of forming a $C_M$—Si/$PE_1$ composite thin film is provided. $PE_1$ solution is prepared in chloroform with the concentration of 25 mg/mL, $C_M$—Si solutions is prepared in chloroform, and the concentration preferably 80 mg/mL. The two solutions are blended with 56% wt $C_M$—Si. After blending for 24 hrs, the blend changes to a sol-gel solution. The solution-gel mixture is deposited on the glass substrate by spin-coating at a speed of 1500 rpm for 60 seconds. After spin coating, the thin film is dried in the oven for 10 min at 353K.

In another embodiment, a method of forming a $C_6$—Si/$PE_2$ composite thin film is provided. $PE_3$ solution is prepared in chloroform with the concentration of 25 mg/mL, $C_6$—Si solutions is prepared in chloroform, and the concentration preferably 80 mg/mL. The two solutions are blended with 24% wt $C_6$—Si. After blending for 24 hrs, the blend changes to a sol-gel solution. The solution-gel mixture is deposited on the glass substrate by spin-coating at a speed of 1500 rpm for 60 seconds. After spin coating, the thin film is dried in the oven for 10 min at 353K.

In another embodiment, a method of forming a $C_6$—Si/ProDOT composite thin film is provided. ProDOT solution is prepared in chloroform with the concentration of 25 mg/mL Heptyltrichlorosilane (C6-Si) solution is prepared in chloroform with the concentrations of 80 mg/mL. The two solutions are blended with 56% wt $C_6$—Si. After blending for 90 hrs, the blend changes to a sol-gel solution. For the purpose of film processing, 5-20 μl (preferably 10 μl) ethanol is added to the gel to break the hydrogen bonding and the mixture returned to solution state. $C_6$—Si/ProDOT composite is deposited on the glass substrate by spin-coating at a speed of 1500 rpm for 60 seconds. After spin coating, the composite thin film is dried in the oven for 10 min at 353K.

Overall, the present disclosure discloses a thermally stable and solvent resistant conductive polymer composite comprising a host conjugated polymer and a crosslinked siloxane network. The disclosure also presents a manufacturing friendly preparation method to make the disclosed composite. The approach by simply mixing a host conjugated polymer and a crosslinkable silane precursor to simultaneously introduce both dopant and rigid cross-linked siloxane network into polymer system is disclosed to improve stability of doped system. The thin film made by the disclosed thermally stable and solvent resistant conductive polymer composite can be applied to fabricate various devices, such as OLED, OECD.

What is claimed is:

1. A conductive polymer composite comprising a doped host conjugated polymer and a crosslinked siloxane network, wherein the doped host conjugated polymer comprises a dioxythiophene copolymer with a formula of wherein
  x is an integer greater than 0;
  y is an integer equal to or greater than 0;
  n is an integer greater than 0;
  values of x and y indicate ratios of two monomer units, but not necessarily an exact monomer sequence in the polymer; and
  average ratio of y:x ranges from 0 to 10.

2. The conductive polymer composite of claim 1, wherein the crosslinked siloxane network is produced from a crosslinkable silane precursor with a formula of wherein:
  n is an integer greater than 0;
  X is a monomer unit and is selected from one or more of a group including:
    oxygen, urea group ($N_2H_2CO$—), $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$heterocyclyl, $C_1$-$C_{12}$heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$heterocyclylcarbonyl, $C_3$-$C_{30}$ heterocyclylalkyl, $C_1$-$C_{13}$ heteroaryl, or $C_3$-$C_{30}$ heteroarylalkyl;
  each of $R_1$, $R_2$, $R_3$, $R_4$, $R_5$, and $R_6$ groups is independently selected from: hydrogen, halide groups, hydroxyl groups; carboxylic groups, $C_1$-$C_3$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{15}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$heterocyclylcarbonyl, $C_3$-$C_{30}$ heterocyclylalkyl, $C_1$-$C_{13}$ heteroaryl, or $C_3$-$C_{30}$ heteroarylalkyl;
  at least three out of $R_1$, $R_2$, $R_3$, $R_4$, $R_5$, and $R_6$ groups are selected from a group including a chloride group, a bromine group, a hydroxyl group, and an alkyloxy group;
  at least one out of $R_1$, $R_2$, $R_3$, $R_4$, $R_5$, and $R_6$ groups comprise a doping agent.

3. The conductive polymer composite of claim 2, wherein the crosslinkable silane precursor comprises a crosslinkable chlorosilane precursor with a formula of wherein:
  n is an integer greater than 0, and equal to or less than 13.

4. The conductive polymer composite of claim 3, wherein the crosslinkable chlorosilane precursor comprises 6 or 10 spacer carbons with the formulas of or 5. The conductive polymer composite of claim 1, wherein the doped host conjugated polymers comprise a p-type conjugated polymer with an oxidation potential lower than 0.4 V vs. Ag/AgCl.

6. The conductive polymer composite of claim 1, wherein x is equal to 1, and y is equal to 1, 2 or 3.

7. A conductive polymer composite comprising a doped host conjugated polymer and a crosslinked siloxane network, wherein the crosslinked siloxane network is produced from a crosslinkable silane precursor with a formula of wherein:
  each of $R_7$, $R_8$, $R_9$, and $R_{10}$ groups is independently selected from a group including: hydrogen, halide groups, hydroxyl group; carboxylic groups, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_{18}$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$ heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$heterocyclylcarbonyl, $C_3$-$C_{30}$ heterocyclylalkyl, $C_1$-$C_{13}$ heteroaryl, or $C_3$-$C_{30}$ heteroarylalkyl;

at least three out of the $R_7$, $R_8$, $R_9$, and $R_{10}$ groups are selected from a group including chloride group, bromine group, hydroxyl group and alkyloxyl group;

at least one out of $R_7$, $R_8$, $R_9$, and $R_{10}$ groups comprise a doping agent.

8. The conductive polymer composite of claim 7, wherein the crosslinkable silane precursor comprises a crosslinkable chlorosilane precursor with a formula of

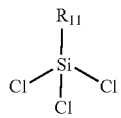

wherein:

$R_{11}$ is selected from a group including: hydrogen, halide groups, hydroxyl group; carboxylic groups, $C_1$-$C_{30}$ alkyl, $C_2$-$C_{30}$ alkenyl, $C_2$-$C_{30}$ alkynyl, $C_2$-$C_{30}$ alkylcarbonyl, $C_1$-$C_{30}$ alkoxy, $C_3$-$C_{30}$ alkoxyalkyl, $C_2$-$C_{30}$ alkoxycarbonyl, $C_4$-$C_{30}$ alkoxycarbonylalkyl, $C_1$-$C_{30}$ aminylcarbonyl, $C_4$-$C_{30}$ aminylalkyl, $C_1$-$C_{30}$ alkylaminyl, $C_1$-$C_{30}$ alkylsulfonyl, $C_3$-$C_{30}$ alkylsulfonylalkyl, $C_6$-$C_1$ aryl, $C_3$-$C_{15}$ cycloalkyl, $C_3$-$C_{30}$ cycloalkylaminyl, $C_5$-$C_{30}$ cycloalkylalkylaminyl, $C_5$-$C_{30}$ cycloalkylalkyl, $C_5$-$C_{30}$ cycloalkylalkyloxy, $C_1$-$C_{12}$ heterocyclyl, $C_1$-$C_{12}$heterocyclyloxy, $C_3$-$C_{30}$ heterocyclylalkyloxy, $C_1$-$C_{30}$ heterocyclylalkyloxy, $C_1$-$C_{30}$ heterocyclylaminyl, $C_5$-$C_{30}$ heterocyclylalkylaminyl, $C_2$-$C_{12}$heterocyclylcarbonyl, $C_3$-$C_{30}$ heterocyclylalkyl, $C_1$-$C_{13}$ heteroaryl, or $C_3$-$C_{30}$ heteroarylalkyl.

9. The conductive polymer composite of claim 8, wherein the crosslinkable chlorosilane precursor comprises a monotrichlorosilyl with the formula of

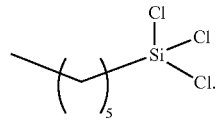

10. A device incorporating a thin film made of the conductive polymer composite of any one of claims 2-6.

11. A method of making a conductive polymer composite, the method comprising:

providing a solution of crosslinkable silane precursors in a solvent;

providing a solution of host conjugated polymers in a solvent;

producing a solution comprising the conductive polymer composite by mixing the solution of crosslinkable silane precursors with the solution of host conjugated polymers with a ratio of the crosslinkable silane precursors in a range of 0.1 to 90 wt % for a reaction time up to 168 hours; and adding a hydrogen bond interrupting solvent to break hydrogen bond of the conductive polymer composite and improve solution consistency after producing the solution comprising the conductive polymer composite.

12. The method of claim 11, wherein the solvents for preparing the solution of crosslinkable silane precursors and the solution of host conjugated polymers are selected from one or more of aprotic solvents.

13. The method of claim 11, wherein the hydrogen bond interrupting solvent includes at least one of alcohol or acetone.

* * * * *